US007743051B1

(12) United States Patent
Kashyap et al.

(10) Patent No.: US 7,743,051 B1
(45) Date of Patent: Jun. 22, 2010

(54) METHODS, SYSTEMS, AND USER INTERFACE FOR E-MAIL SEARCH AND RETRIEVAL

(75) Inventors: Anurag Kashyap, Union City, CA (US); Malay Desai, Fremont, CA (US); Venkat Rangan, San Jose, CA (US); Gary Lehrman, Cupertino, CA (US)

(73) Assignee: Clearwell Systems, Inc., Mountain View, CA (US)

( * ) Notice: Subject to any disclaimer, the term of this patent is extended or adjusted under 35 U.S.C. 154(b) by 285 days.

(21) Appl. No.: 11/838,747

(22) Filed: Aug. 14, 2007

Related U.S. Application Data

(63) Continuation-in-part of application No. 11/657,398, filed on Jan. 23, 2007, which is a continuation of application No. 11/457,317, filed on Jul. 13, 2006, now Pat. No. 7,593,995.

(60) Provisional application No. 60/761,501, filed on Jan. 23, 2006, provisional application No. 60/761,679, filed on Jan. 23, 2006, provisional application No. 60/761,500, filed on Jan. 23, 2006.

(51) Int. Cl.
*G06F 17/30* (2006.01)
*G06F 7/00* (2006.01)
(52) U.S. Cl. .................... 707/713; 707/718; 707/719; 707/769
(58) Field of Classification Search ............. None
See application file for complete search history.

(56) References Cited

U.S. PATENT DOCUMENTS

| 6,275,820 | B1 | 8/2001 | Navin-Chandra et al. | |
|---|---|---|---|---|
| 6,385,602 | B1 | 5/2002 | Tso et al. | |
| 7,007,067 | B1 | 2/2006 | Azvine et al. | |
| 7,185,000 | B1 * | 2/2007 | Brown et al. | 707/3 |
| 7,421,690 | B2 | 9/2008 | Forstall et al. | |
| 2002/0078158 | A1 | 6/2002 | Brown et al. | |
| 2003/0023435 | A1 | 1/2003 | Josephson | |
| 2003/0028580 | A1 | 2/2003 | Kucherawy | |
| 2003/0167402 | A1 | 9/2003 | Stolfo et al. | |
| 2003/0195937 | A1 | 10/2003 | Kircher et al. | |
| 2004/0128276 | A1 * | 7/2004 | Scanlon et al. | 707/1 |
| 2004/0133564 | A1 * | 7/2004 | Gross et al. | 707/3 |
| 2004/0221295 | A1 | 11/2004 | Kawai et al. | |
| 2005/0055359 | A1 | 3/2005 | Kawai et al. | |

(Continued)

OTHER PUBLICATIONS

Bernard Kerr, Thread Arcs: An Email Thread Visulization, Collaborative User Experience Group IBM Research, 2003.

(Continued)

*Primary Examiner*—Greta L Robinson
*Assistant Examiner*—James J Wilcox
(74) *Attorney, Agent, or Firm*—Townsend and Townsend and Crew LLP

(57) ABSTRACT

Methods and systems for searching e-mails are disclosed. In one embodiment, a method for searching e-mails includes receiving input indicative of one or more search terms. A query plan is determined based on the one or more search terms. The method includes performing a search in response to the query plan to determine information related to the one or more e-mails. Then, a set of results are generated based on the information related to the one or more e-mails.

21 Claims, 22 Drawing Sheets

U.S. PATENT DOCUMENTS

| | | |
|---|---|---|
| 2005/0097321 A1 | 5/2005 | Zhu et al. |
| 2005/0223061 A1 | 10/2005 | Auerbach et al. |
| 2005/0228774 A1 | 10/2005 | Ronnewinkely |
| 2006/0031373 A1 | 2/2006 | Werner et al. |
| 2006/0083357 A1 | 4/2006 | Howell et al. |
| 2006/0083358 A1 | 4/2006 | Fong et al. |
| 2006/0242243 A1 | 10/2006 | Matsumoto |
| 2007/0083598 A1 | 4/2007 | Kawakami et al. |
| 2007/0106729 A1 | 5/2007 | Adams et al. |
| 2007/0157287 A1 | 7/2007 | Lim |

OTHER PUBLICATIONS

Maryam Samiei, EzMail: Using Information Visualization Techniques to Help Manage Email, School of Engineering Science Simon Fraser University, 2004.

Stephen Wan, Generating Overview Summeries of Ongoing Email Discussions, Department of Computing Macquarine University, 2004.

Yejun Wu, Indexing emails and email threads for retrieval, College on Information Studies and UMIACS University of Maryland, 2005.

\* cited by examiner

METHODS, SYSTEMS, AND USER INTERFACE FOR E-MAIL SEARCH AND RETRIEVAL

CROSS-REFERENCES TO RELATED APPLICATIONS

This application is a continuation-in-part of and claims priority to U.S. patent application Ser. No. 11/657,398, filed Jan. 23, 2007 and entitled "Methods and Systems of Electronic Message Threading and Ranking," which is a continuation of U.S. patent application Ser. No. 11/457,317 (U.S. Pat. No. 7,593,995 B1), filed Jul. 13, 2006 and entitled "Methods and Systems of Electronic Message Threading and Ranking" which claims the benefit of U.S. Provisional Application No. 60/761,500, filed Jan. 23, 2006 and entitled "E-Mail Threading, Ranking, Derivation and Topic Classification Methods and Apparatus;" U.S. patent application Ser. No. 11/657,398 also claims the benefit of U.S. Provisional Application No. 60/761,501, filed Jan. 23, 2006 and entitled "Incremental E-Mail Crawling and Indexing Methods and Apparatus," and U.S. Provisional Application No. 60/761,679, filed Jan. 23, 2006 and entitled "System, Method, and User Interface for Distributed E-Mail Analysis."

The entire disclosures of U.S. patent application Ser. No. 11/657,398, U.S. patent application Ser. No. 11/457,317, U.S. Provisional Application No. 60/761,500, U.S. Provisional Application No. 60/761,501, and U.S. Provisional Application No. 60/761,679 are incorporated herein by reference for all purposes.

BACKGROUND OF THE INVENTION

Embodiments of the present invention generally relate to techniques for processing electronic messages. More particularly, the present invention relates to methods, systems, and user interfaces for e-mail search and retrieval.

Collaboration using electronic messaging, such as e-mail and instant messaging, is becoming increasingly ubiquitous. Many users and organizations have transitioned to "paperless" offices, where information and documents are communicated almost exclusively using electronic messaging. As a result, users and organizations are also now expending time and money to sort and archive increasing volumes of digital documents and data.

At the same time, state and federal regulators such as the Federal Energy Regulatory Commission (FERC), the Securities and Exchange Commission (SEC), and the Food and Drug Administration (FDA) have become increasingly aggressive in enforcing regulations requiring storage, analysis, and reporting of information based on electronic messages. Additionally, criminal cases and civil litigation frequently employ electronic discovery techniques, in addition to traditional discovery methods, to discover information from electronic documents and messages.

One problem is that complying with these disclosure and/or reporting requirements is difficult because of the large amounts of electronic messages that accumulate. As broadband connections to the Internet are common in most homes and businesses, e-mails frequently include one or more multi-megabyte attachments. Moreover, these e-mails and attachments are increasingly of diverse and propriety formats, making later access to data difficult without the required software.

Another problem is that the disclosure and/or reporting requirements do not simply require that the electronic message be preserved and then disclosed. Often, the disclosure and/or reporting requirements are more focused toward information about the electronic message, such as who had access to sensitive data referred to in the contents of a particular electronic message. Some companies have teams of employees spending days and weeks reviewing e-mails in order to respond to regulatory audits and investigations. For these reasons, the inventors believe that users and organizations need electronic message analysis solutions to help lower costs in disclosing and/or reporting information related to electronic messaging.

In light of the above, there is a need for techniques for processing electronic messages that address some of the problems in the prior art.

BRIEF SUMMARY OF THE INVENTION

Embodiments of the present invention generally relate to techniques for processing electronic messages. More particularly, the present invention relates to methods, systems, and user interfaces for e-mail search and retrieval.

In various embodiments, a method for searching e-mails includes receiving input indicative of one or more search terms. A query plan is determined based on the one or more search terms. A search is then performed in response to the query plan to determine information related to the one or more e-mails. A set of results is generated based on the information related to the one or more e-mails.

In some embodiments, given large volumes of e-mails, a search request includes specific textual strings found in the body of an e-mail or the subject line of an e-mail. The search request may also include other parameters, such as a date-range and the like.

In one embodiment, performing a search includes organizing the content in an index, using a full-text searchable index for a textual string-based search and a relational database with database records for range queries. In addition to performing a search, the user may add new tags and other annotations to the search results using a relational database. When data is stored in the full-text index and a relational table, a query plan may be determined and generated to perform the search.

In some embodiments, determining the query plan based on the one or more search terms includes determining a cost associated with executing a database query. A cost associated with executing a full-text query is further determined. The query plan is then generated using a combination of the database query and the full-text query.

In one embodiment, generating the set of results based on the information related to the one or more e-mails includes receiving a first portion of the information in response to the database query. A second portion of the information is received in response to the full-text query. The first and second portions of the information are then merged to generate the set of results.

In various embodiments, determining the query plan based on the one or more search terms includes receiving a filter associated with a set of e-mails. A query is generated in response to the filter. Performing the search using the query plan may include performing the search asynchronously. A score may also be associated with each of the one or more e-mails. Relevance of the one or more e-mails may be determined in response to the score associated with each of the one or more e-mails.

In some embodiments, a computer program product includes a computer-readable medium storing a set of code modules which when executed by a processor of a computer system cause the processor to search for e-mails. The computer program product includes code for receiving input indicative of one or more search terms, code for determining a query plan based on the one or more search terms, code for performing a search in response to the query plan to determine information related to the one or more e-mails, and code for generating a set of results based on the information related to the one or more e-mails.

In further embodiments, a system for searching e-mails includes a crawler, an indexer, and a query engine. The crawler is configured to receive a plurality of e-mails. The indexer is configured to store index information associated with the plurality of e-mails in a database index and a full-text index. The query engine is configured to receive input indicative of one or more search terms, determine a query plan based on the one or more search terms, perform a search in response to the query plan to determine information related to the one or more e-mails, and generate a set of results based on the information related to the one or more e-mails.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Embodiments of the present invention generally relate to techniques for processing electronic messages. More particularly, the present invention relates to methods, systems, and user interfaces for e-mail search and retrieval.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

Processing of Electronic Messages

Figure 1:
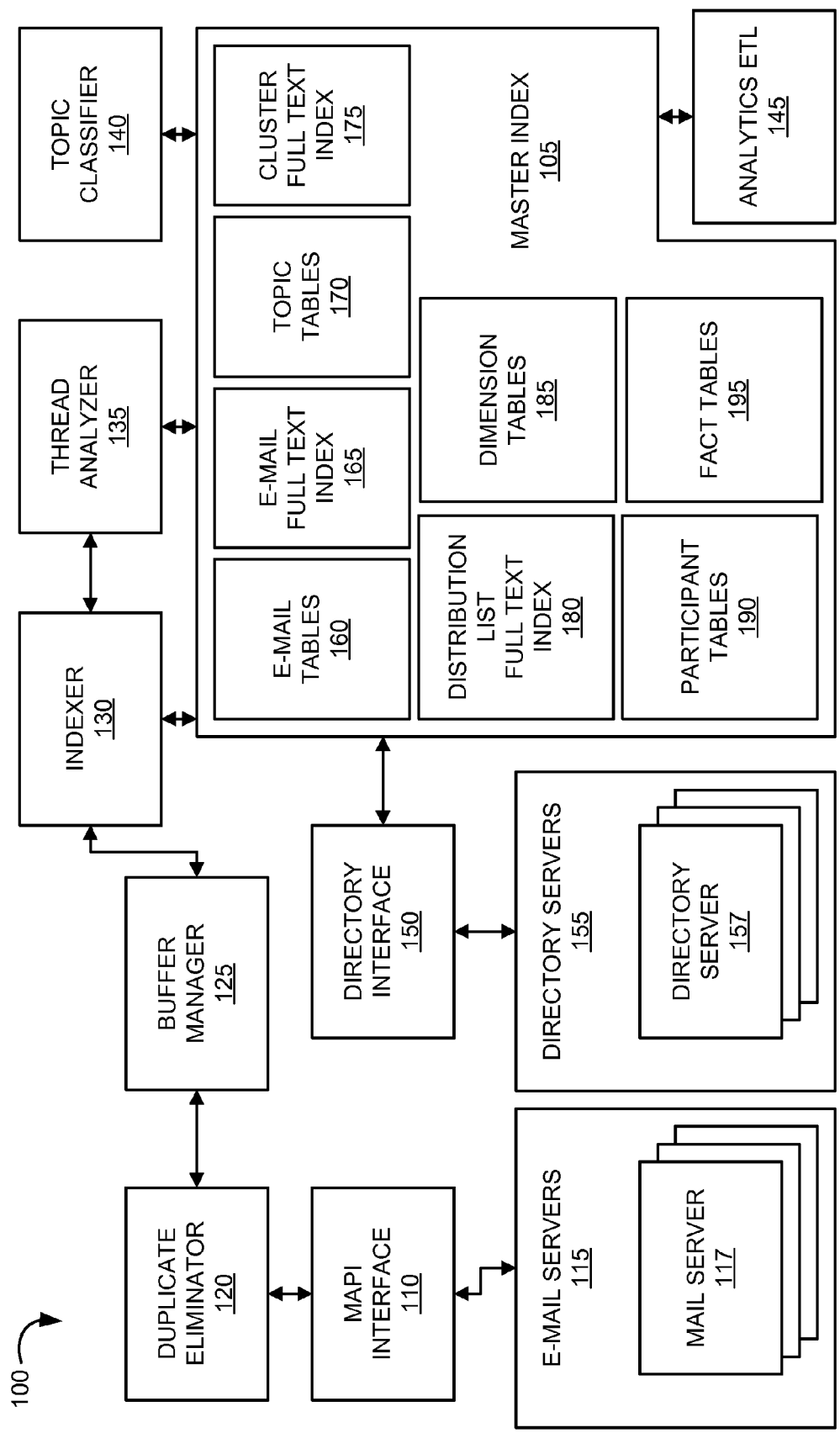
FIG. 1 is a block diagram of an electronic message processing system in one embodiment according to the present invention.

FIG. 1 is a block diagram of an electronic message processing system 100 in one embodiment according to the present invention. Electronic message processing system 100 includes master index 105, messaging applications programming interface (MAPI) module 110, e-mail servers 115, duplicate eliminator 120, buffer manager 125, indexer 130, thread analyzer 135, topic classifier 140, analytics extraction, transformation, and loading (ETL) module 145, directory interface 150, and directory servers 155. Master index 105 includes e-mail tables 160, e-mail full text index 165, topic tables 170, cluster full text index 175, distribution list full text index 180, dimension tables 185, participant tables 190, and fact tables 195. E-mail servers 115 include one or more mail servers 117. Directory servers 155 include one or more directory servers 157.

Master index 105 includes hardware and/or software elements that provide storage and retrieval of information associated with electronic messages, such as e-mail, instant messaging (IM) messages, Short Message Service (SMS) messages, Multimedia Message Service (MMS), and the like. Some examples of master index 105 are flat files, databases, data marts, data warehouses, and other repositories of data. Although the disclosure references electronic messages as e-mail messages, the disclosure should not be considered as limited to only e-mail message formats. The disclosure may also apply to other types of electronic messages, such as IM, SMS, MMC messages, and the like.

In various embodiments, e-mail tables 160 store information associated with e-mail messages processed by the system 100. E-mail full text index 165 stores an inverted index that enables fast searching of contents (e.g., headers and body), metadata, and attachments of e-mail messages processed by the system 100. Topic tables 170 store relationships between categories or topics and e-mail messages processed by the system 100. Cluster full text index 175 stores an index of e-mail messages that have a close relationship, such as relationships based on statistical analysis of noun phrases, and the like. The e-mail messages having close relationships are then associated with topics in the topic tables 170. Distribution list full text index 180 stores the full text of e-mail messages associated with a distribution or mailing list. Participant tables 190 store information related to participants of a distribution or mailing list (e.g., To-recipients, CC-recipients, BCC-recipients, etc.). Dimension tables 185 and fact tables 195 store information related to data warehouse processing of e-mail messages.

MAPI module 110 is linked to the e-mail servers 115 and to the duplicate eliminator 120. In this example, the e-mail servers 115 include one or more mail servers 117. MAPI module 110 includes hardware and/or software elements that communicate with the e-mail servers 115. E-mail servers 115 include hardware and/or software elements that provide electronic messaging services, such as e-mail transport, storage, and retrieval. One example of the mail servers 117 is a computer system running Microsoft Exchange Server 2000 from Microsoft Corporation of Redmond, Wash. In other examples, the e-mail servers 117 may include operating systems, such as Microsoft Windows 2000/XP/2003, UNIX, and Linux, and mail transport agents, mail user agents, and the like. E-mail messages may be stored on the mail servers 117 in a file, such as an Outlook PST file, and the like.

Duplicate eliminator 120 includes hardware and/or software elements that detect and eliminate redundant and/or duplicative information retrieved by the MAPI module 110. Buffer manager 125 is linked to the duplicate eliminator 120 and the indexer 130. Buffer manager 125 includes hardware and/or software elements that manage data communications between the duplicate eliminator 120 and the indexer 130.

Indexer 130 is linked to the master index 105. Indexer 130 includes hardware and/or software elements that process electronic messages to determine message content and generate metadata associated with the electronic messages. For example, the index 130 may process an e-mail message to parse header and body fields to retrieve message content and generate metadata associated with the e-mail message.

Thread analyzer 135 is linked to the indexer 130 and the master index 105. Thread analyzer 135 includes hardware and/or software elements that organize e-mail messages into one or more e-mail threads. An e-mail thread is a series or sequence of one or more e-mail messages that form a logical "discussion" or "communication." Some examples of e-mail messages within an e-mail thread are e-mail messages related by sender address, recipient address, topic, and time. Another example of e-mail messages within an e-mail thread are e-mail messages with forwarding replies, CC-recipients, BCC-recipients, and the like. In this example, the thread analyzer 135 determines the position of an e-mail message in an e-mail thread in response to message content and metadata of the e-mail message.

Topic classifier 140 is linked to the master index 105. Topic classifier 140 includes hardware and/or software elements that determine one or more topics or categories in response to e-mail message content and metadata. The topic classifier 140 may determine the topic of an e-mail message based on the subject header or in response to the content of the body of an e-mail message. The topic classifier 140 may also associate an e-mail message with a given topic, classifier, and/or category.

Analytics ETL module 145 is linked to the master index 105. Analytics ETL module 145 includes hardware and/or software elements that provide an interface accessing content and metadata processed by the system 100. In one example, the analytics ETL module 145 provides an interface for extracting data from the master index 105 and/or external data sources; an interface for transforming the data, which includes cleansing, aggregation, summarization, integration, as well as basic transformation; and an interface for loading the data into some form of data warehouse for further analysis and processing.

Directory interface 150 is linked to the master index 105 and the directory servers 155. Directory interface 150 includes hardware and/or software elements that access information stored in a directory. A directory is any database of information associated with objects, such as users or computer hosts. In various embodiments, the directory servers 155 include one or more directory servers 157 running Active Directory by Microsoft Corporation of Redmond, Wash. In other embodiments, other types of directory servers and/or services may be used such as Lightweight Directory Access Protocol (LDAP) servers, Identity Management servers, and the like. In various embodiments, examples of information stored in the directory servers 155 include "organizational" or "corporate" data, such as department identifiers associated with a user or computer host, a group identifier associated with a user, a corporate or departmental title associated with a user, telephone and address information, and security information.

In operation of the electronic message processing system 100, the MAPI module 110 retrieves e-mail messages from the e-mail servers 115 (e.g., from one of the mail servers 117). For example, the system 100 may "crawl" the e-mail servers 115 requesting e-mail messages through the MAPI module 110. The duplicate eliminator 120 filters redundant and/or duplicate e-mail messages received from the e-mail servers 115.

The indexer 130 receives the e-mail messages from the duplicate eliminator 120 through the buffer manager 125. The indexer 130 processes the e-mail messages to determine the contents of the e-mail messages and metadata associated with each e-mail message. The indexer 130 stores a full text index of the e-mail messages and the metadata in the master index 105. For example, the indexer 130 stores sender and recipient information associated with an e-mail message in the e-mail tables 160; the indexer 130 stores an inverted word list of the full text of the e-mail message in the e-mail full text index 165; etc.

The thread analyzer 135 processes the contents of the e-mail messages and the metadata in the master index 105 to organize the e-mail messages into e-mail threads. In general, the thread analyzer 135 organizes the e-mail messages into e-mail threads that form a discussion or communication of a topic or concept. One example of operation of the thread analyzer 135 is described below with respect to FIGS. 9, 10A, and 10B. The topic classifier 140 processes the contents of the e-mail messages and the metadata in the master index 105 to determine topics or categories associated with the e-mail messages. The topic classifier 140 stores the categories or topics in the topics tables 170, and stores a full text index of e-mail messages belonging to and/or associated with the same topic in the cluster full text index 175.

The directory interface 150 retrieves directory or organizational information from the directory servers 155 (e.g., from one of the directory servers 157) related to the e-mail messages. The indexer 130 or the thread analyzer 135 may use the organizational information during, processing, indexing, and/or threading of the e-mail message. In this example, the organizational data is stored in the participant tables 190 and the distribution list full text 180.

A user or computer process connects to the analytics ETL module 145 to retrieve information associated with the e-mail messages processed by the system 100. Advantageously, the electronic message processing system 100 provides a user or organization with access to e-mail messages, and other information, such as header information, message contents, message attributes, metadata, and the like, to assist in reporting requirements or gathering information for the purposes of electronic discovery. After "crawling" e-mail repositories (e.g., one of the mail servers 117) to retrieve e-mail messages, the system 100 processes and indexes the retrieved e-mail messages and stores metadata related to the processed e-mail messages in the master index 105. The system 100 allows the user or organization to search and query the processed e-mail messages and the metadata to quickly extract and process relevant information. The system 100 further provides threading and topic classification of e-mail messages to enhance the discovery and presentation of relevant information to the user or organization.

In various embodiments, after an initial crawl of a data or e-mail repository, such as the e-mail servers 115, the system 100 may incrementally process newly arriving e-mail messages on a daily bases, an hourly basis, or the like. As described above, the new e-mail messages may be incorporated into the master index 105.

Figure 2:
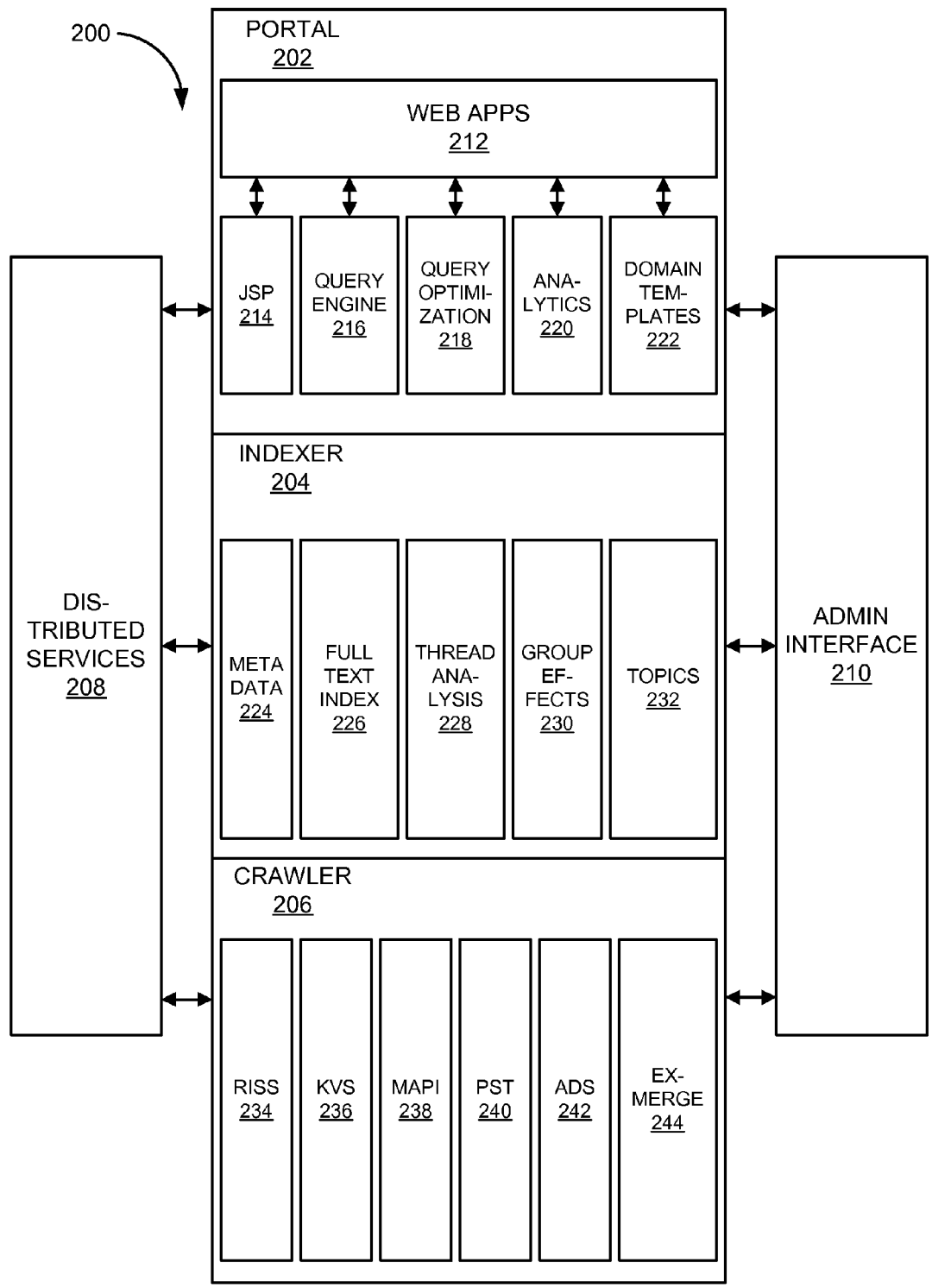
FIG. 2 is a block diagram of software components for processing electronic messages in one embodiment according to the present invention.

FIG. 2 is a block diagram of software components 200 for processing e-mail messages in one embodiment according to the present invention. Software components 200 include portal 202, indexer 204, crawler 206, distributed services 208, and administration interface 210. Portal 202 is linked to the indexer 204, which is linked to the crawler 206. Distributed services 208 and administration interface 210 are linked to each of the portal 202, the indexer 204, and the crawler 206.

Portal 202 includes software elements for accessing and presenting information provided by the indexer 204. In this example, the portal 202 includes web applications 212 communicatively coupled to information gathering and presentation resources, such as a Java Server Page (JSP) module 214, a query engine 216, a query optimization module 218, an analytics module 220, and a domain templates module 222.

Indexer 204 includes software elements for processing and storing e-mail messages. The indexer 204 includes metadata 224, full text indices 226, thread analysis 228, group effects 230, and topics 232.

Crawler 206 includes software elements for retrieving e-mail messages from an e-mail repository. Some examples of an e-mail repository are an e-mail server (e.g., one of the mail servers 117 of FIG. 1), a Post Office Protocol (POP) enabled computer server, an Internet Message Access Protocol (IMAP) enabled computer server, and files, such as PST files, UNIX style maildirs/mbox formats, and the like. In this example, the crawler 206 includes Reference Information Storage System (RISS) module 234, Enterprise Vault Software (EV) module 236, MAPI module 238, PST module 240, Directory Services (ADS) module 242, and a Microsoft Exchange Server Mailbox Merge Wizard (ExMerge) module 244.

Figure 3:
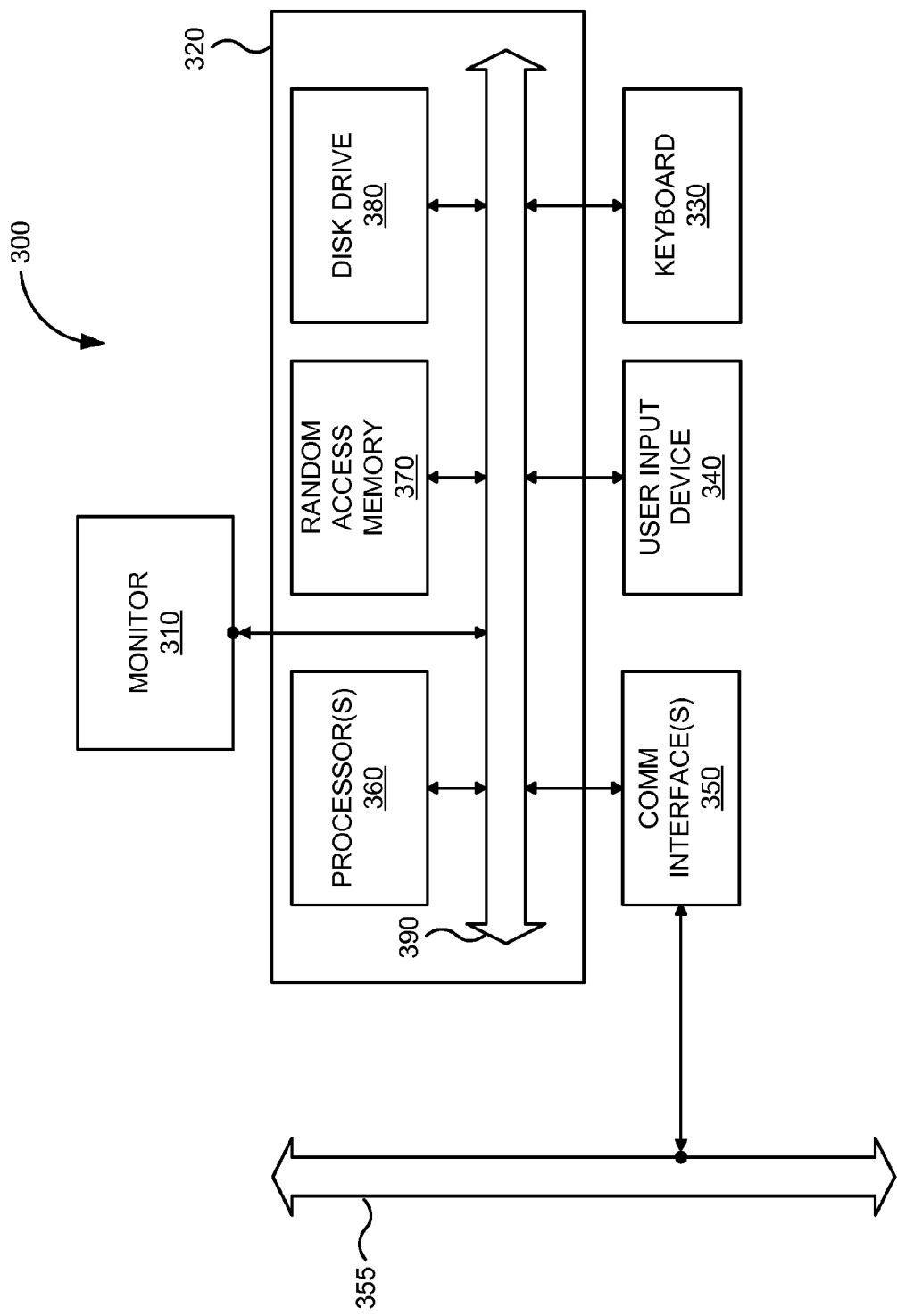
FIG. 3 is a block diagram of a computer system that may be used for processing electronic messages in one embodiment according to the present invention.

FIG. 3 is a block diagram of a computer system 300 in one embodiment according to the present invention. In this example, computer system 300 includes a monitor 310, computer 320, a keyboard 330, a user input device 340, one or more computer interfaces 350, and the like. In the present embodiment, the user input device 340 is typically embodied as a computer mouse, a trackball, a track pad, a joystick, wireless remote, drawing tablet, voice command system, eye tracking system, and the like. The user input device 340 typically allows a user to select objects, icons, text and the like that appear on the monitor 310 via a command such as a click of a button or the like.

Embodiments of the computer interfaces 350 typically include an Ethernet card, a modem (telephone, satellite, cable, ISDN), (asynchronous) digital subscriber line (DSL) unit, FireWire interface, USB interface, and the like. For example, the computer interfaces 350 may be coupled to a computer network 355, to a FireWire bus, or the like. In other embodiments, the computer interfaces 350 may be physically integrated on the motherboard of the computer 320, may be a software program, such as soft DSL, or the like.

In various embodiments, the computer 320 typically includes familiar computer components such as a processor 360, and memory storage devices, such as a random access memory (RAM) 370, disk drives 380, and system bus 390 interconnecting the above components.

The RAM 370 and disk drive 380 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 300 may also include software that enables communications over a network such as the HTTP, TCP/IP, RTP/RTSP protocols, and the like. In alternative embodiments of the present invention, other communications software and transfer protocols may also be used, for example IPX, UDP or the like.

It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Core™ microprocessors from Intel; Sempron™ or Athlon64™ microprocessors from Advanced Micro Devices, Inc.; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. a programmable logic device or a graphics processor unit).

In operation, computer system 300 receives electronic messages, such as e-mail messages, from electronic messaging repositories. Computer system 300 processes an e-mail message to determine message attribute data associated with the e-mail messages. Message attribute data is information related to an attribute or content of an electronic message. Some examples of message attribute data are sender e-mail address or sender identifiers, recipient identifiers, names associated with sender/recipient identifiers, attachment data, in-line text, body content, routing information, header information, and the like. The message attribute data allows computer system 300 to provide users and organizations with access to message content, relationships between e-mail messages, topics, rankings, and the like.

Figure 4:
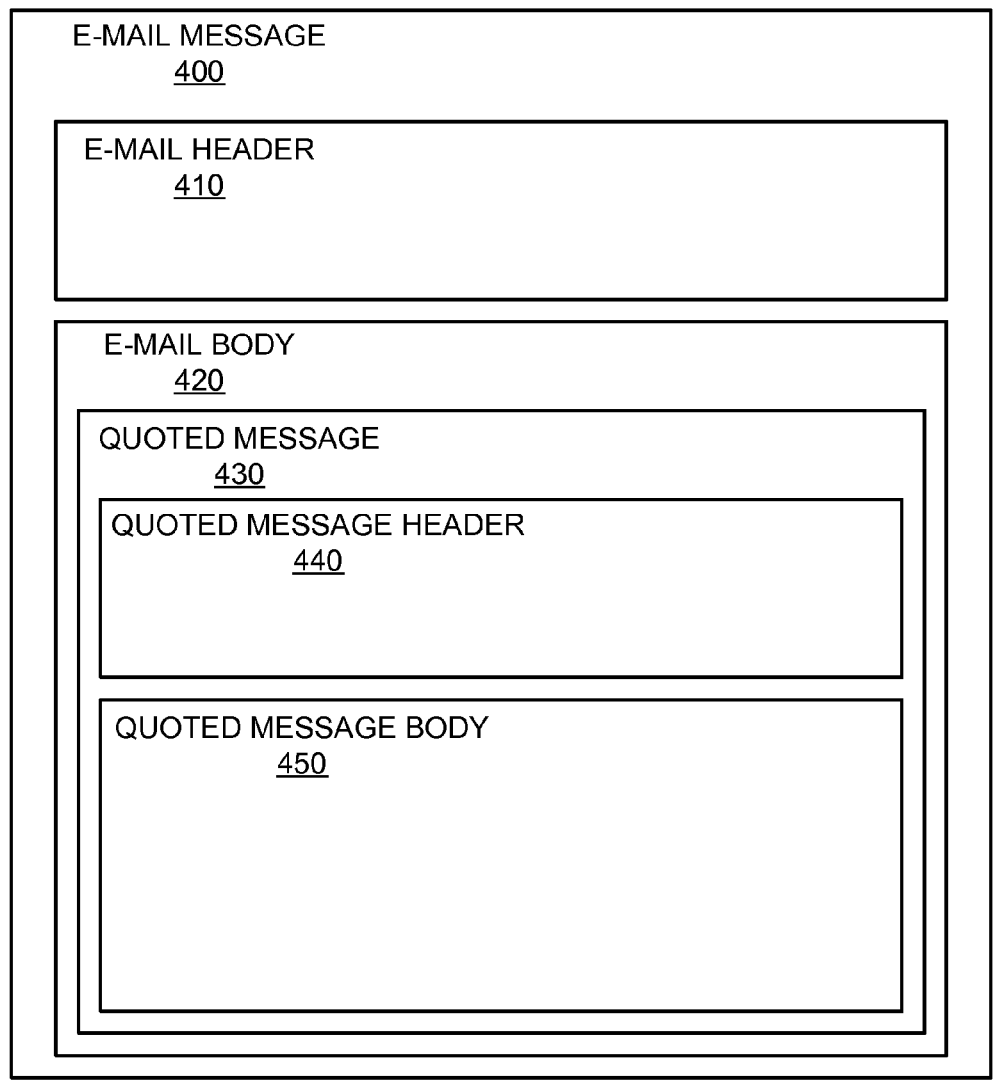
FIG. 4 is a block diagram of an exemplary e-mail message.

FIG. 4 is a block diagram of an exemplary e-mail message 400. The e-mail message 400 can be any message transmitted over a communications network, such as the Internet. In one example, the e-mail message 400 is a message communicated using one of the protocols adapted for communication using the Transport Control Protocol/Internet Protocol (TCP/IP) suite of protocols used over the Internet, such as the Simple Mail Transfer Protocol (SMTP). The e-mail message 400 may be communicated by using dedicated messaging client, such as Outlook and the like, and a web browser, such as Mozilla Firefox and Microsoft Internet Explorer and the like using a web-mail interface.

E-mail message 400 includes e-mail header 410 and e-mail body 420. In this example, e-mail header 410 generally includes message attribute data related to header information, such as routing information, spam/virus scanning information, a subject, a sender identifier (e.g., the originating or sending e-mail address), one or more recipient identifiers (e.g., To-recipients, CC-recipients, and BCC-recipients, and distribution list e-mail addresses), priority, and the like. As the e-mail message 400 travels to its destination, information about the path or network hosts through which the e-mail message 400 passed may be appended to the e-mail header 410 in the routing information.

E-mail header 410 may also contain information about the e-mail client from which the e-mail message 400 was sent. Additionally, the e-mail header 410 may include information related to the format or encoding used to communicate the e-mail body 420.

The e-mail message 400 is typically encoded in ASCII (American Standard Code for Information Interchange) text. The e-mail message 400 includes message attribute data related to portions (e.g., headers, body, etc.) of the e-mail message 400. In various embodiments, the e-mail body 420 includes non-text data, such as graphic images and sound files and the like, in-line with text and as attachments. Some examples of the contents of the e-mail body 420 are plain text, base-64 encoded text, an encoded binary file, a portion of an e-mail message, an attached Portable Document Format (PDF) file, an attached or in-line Microsoft Word document file, and the like.

In various embodiments, e-mail body 420 of the e-mail message 400 also includes a quoted message 430. The quoted message 430 itself includes quoted message header 440 and quoted message body 450. In general, quoted message 430 is a portion of an e-mail message or an entire e-mail message. Portions of e-mail messages are often included in-line with other text in the e-mail body 420. For example, the e-mail message 400 may be a reply to an initial or earlier e-mail message that is included in the e-mail body 420 as the quoted message 430. Entire or complete e-mail messages are often included in-line or as an attachment to the e-mail message 400. In other embodiments, quoted message 430 may be a forwarded messages, etc.

Quoted message header 430 comprises information, such as sender and recipient identifiers, much like the e-mail header 410. Often, the quoted message header 430 includes at least a sender identifier, one or more recipient identifiers, a subject, a timestamp, and the like. Quoted message body 450 may be plain text, html, encoded text, and the like. The quoted text body 450 also may include portions of other e-mail messages and attachments.

Figure 5:
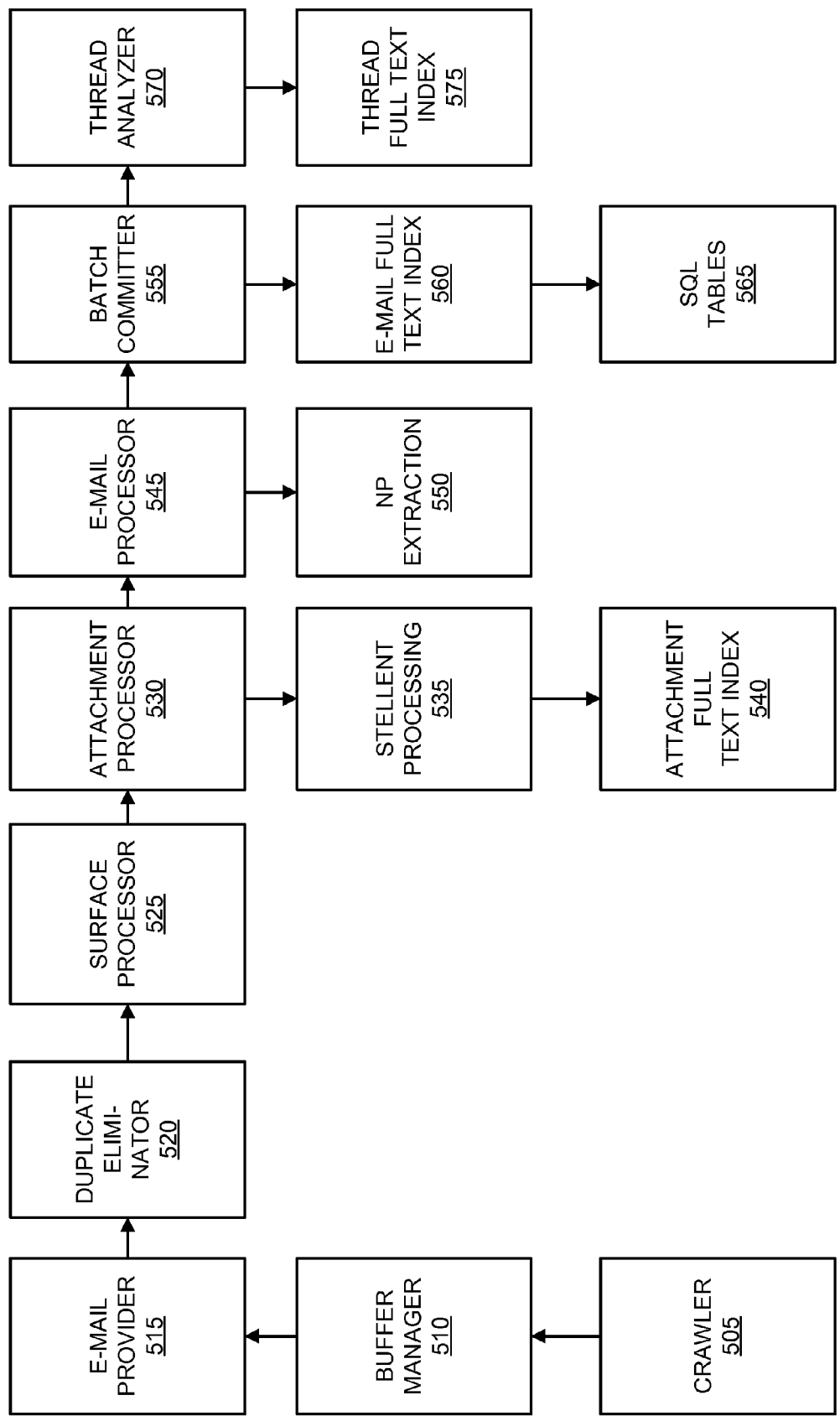
FIG. 5 is a block diagram illustrating an exemplary processing flow of e-mail messages in one embodiment according to the present invention.

FIG. 5 is a block diagram illustrating an exemplary processing flow of electronic messages in one embodiment according to the present invention. In crawler box 505, computer system 300 retrieves e-mail messages from e-mail repositories, such as an e-mail server or a file containing e-mail messages, and sends the e-mail messages to a buffer manager. In buffer manager box 510, computer system 300 buffers or otherwise manages production and consumption of the e-mail messages retrieved while computer system 300 is "crawling" the e-mail repositories. In e-mail provider box 515, computer system 300 creates batches of e-mail messages. In this example, batching the e-mail messages allows computer system 300 to apply batch-processing techniques to message attribute data associated with a batch of e-mail messages. For example, computer system 300 may create batches of 10, 50, or 100 e-mail messages.

In duplicate eliminator box 520, computer system 300 processes the e-mail messages in the e-mail message batches to determine duplicates or redundant e-mail messages. For example, a user A of the mail server 117 (FIG. 1) may have sent an e-mail message addressed to user B and to user C. When computer system 300 retrieves e-mail messages from mailboxes on the mail server 117 for users A, B, and C, user A's mailbox contains the e-mail message as sent to user B and user C. Additionally, both user B's and user C's mailbox contains the respective user's copy of the e-mail message as received from user A. In this example, computer system 300 receives possibly three copies of the e-mail message in the duplicate eliminator box 520.

Computer system 300 determines which of the three copies of the e-mail message to further process. In one example, computer system 300 determines two MD5 checksums for each e-mail message to "identify" an e-mail message. A first strict MD5 checksum is computed to be unique and represents an exact match of a previously processed e-mail message. A second "relaxed" MD5 checksum is computer to be non-unique or semi-unique.

When computer system 300 receives a new e-mail, computer system 300 processes the new e-mail message (e.g., address normalization and cleansing) and computes a strict MD5 checksum for the new e-mail message and compares the strict MD5 checksum to previously computed strict MD5 checksums to determine whether the new e-mail message is unique. In one example of operation, computer system 300 computes the strict MD5 checksum in response to message attribute data associated with an e-mail message using the sender e-mail address or sender identifier, sorted To-recipient e-mail addresses or To-recipient identifiers, sent time, alphanumeric contents of subject, and the body text (e.g., body text size, contents of the body text, etc.).

Computer system 300 then computes a relaxed MD5 checksum using a portion of the message attribute data used to compute the strict MD5 checksum. Other information not included in the e-mail message but associated with the message attribute data may be used to compute the strict and relaxed MD5 checksums. Other types of integrity, detection, and authenticity algorithms, such as cyclical redundancy checks (CRCs), hashes, and the like, may be used in addition to or in the alternative to the MD5 checksum.

In this example, if the strict MD5 checksum for the new e-mail message is different, computer system 300 computes a relaxed MD5 checksum for the new e-mail message and compares the relaxed MD5 checksum to previously computed relaxed MD5 checksums. If the relaxed MD5 checksum for the new e-mail message is different, then the new-e-mail address is not a duplicate. If the relaxed MD5 checksum for the new e-mail message is the same as one or more previously computed relaxed MD5 checksums, computer system 300 applies rules or policies to eliminate possible duplicate e-mail messages that may occur due to time differences, header processing, and the like, and also the addition of trailing content, such as disclaimers, names of attachment files, and the like.

In surface processor box 525, computer system 300 processes the e-mail messages (e.g., to populate the master index 105 of FIG. 1 with information related to the message attribute data). Some examples of surface processing are whether text in a body of an e-mail message is text included in another e-mail message (e.g., as a response to the e-mail message), identity information of senders, and identity information of recipients. In attachment processor box 530, computer system 300 processes the e-mail message for attachments. If an e-mail message includes an attachment, computer system 300 further processes the attachment in stellent processing box 535. In this example, computer system 300 processes the attachment according to content management and searching solutions from Stellent, Inc. of Eden Prairie, Minn. In attachment full text index box 540, computer system 300 stores an inverted index of the extracted text of an attachment, if any (e.g., in the master index 105).

In e-mail processing box 545, after attachment processing or if no attachment exists in an e-mail message, computer system 300 operates on the batch of e-mail messages to parse or extract further information associated with message attribute data from the e-mail messages. In NP extraction box 550, for example, computer system 300 processes subject and body content of the e-mail messages, such as to extract noun phrases, and the like. Computer system 300 then normalizes the extracted noun phrases into a feature vector that represents topical information associated with the e-mail messages.

In batch committer box 555, computer system 300 commits the processed e-mail messages in the batch to storage. In one example, computer system 300 populates the master index 105 with information parsed or indexed in the e-mail processor box 545. In e-mail full text index box 560 of this example, computer system 300 stores a full text index of the e-mail messages (e.g., in the e-mail full text index 165 of FIG. 1). In SQL tables box 565, computer system 300 prepares Structured Query Language (SQL) tables allowing the e-mail messages and message attribute data associated with the e-mail messages in the batch to be searched using SQL statements.

In thread analyzer box 570, computer system 300 processes the e-mail messages to determine e-mail threads in response to message attribute data of the e-mail messages. In thread full text index box 575, computer system 300 stores a full text index of e-mail threads (e.g., in the master index 105). Further operations of computer system 300 in the thread analyzer box 570 are described further with respect to FIGS. 8A, 8B, 9, 10A, and 10B.

Figure 6:
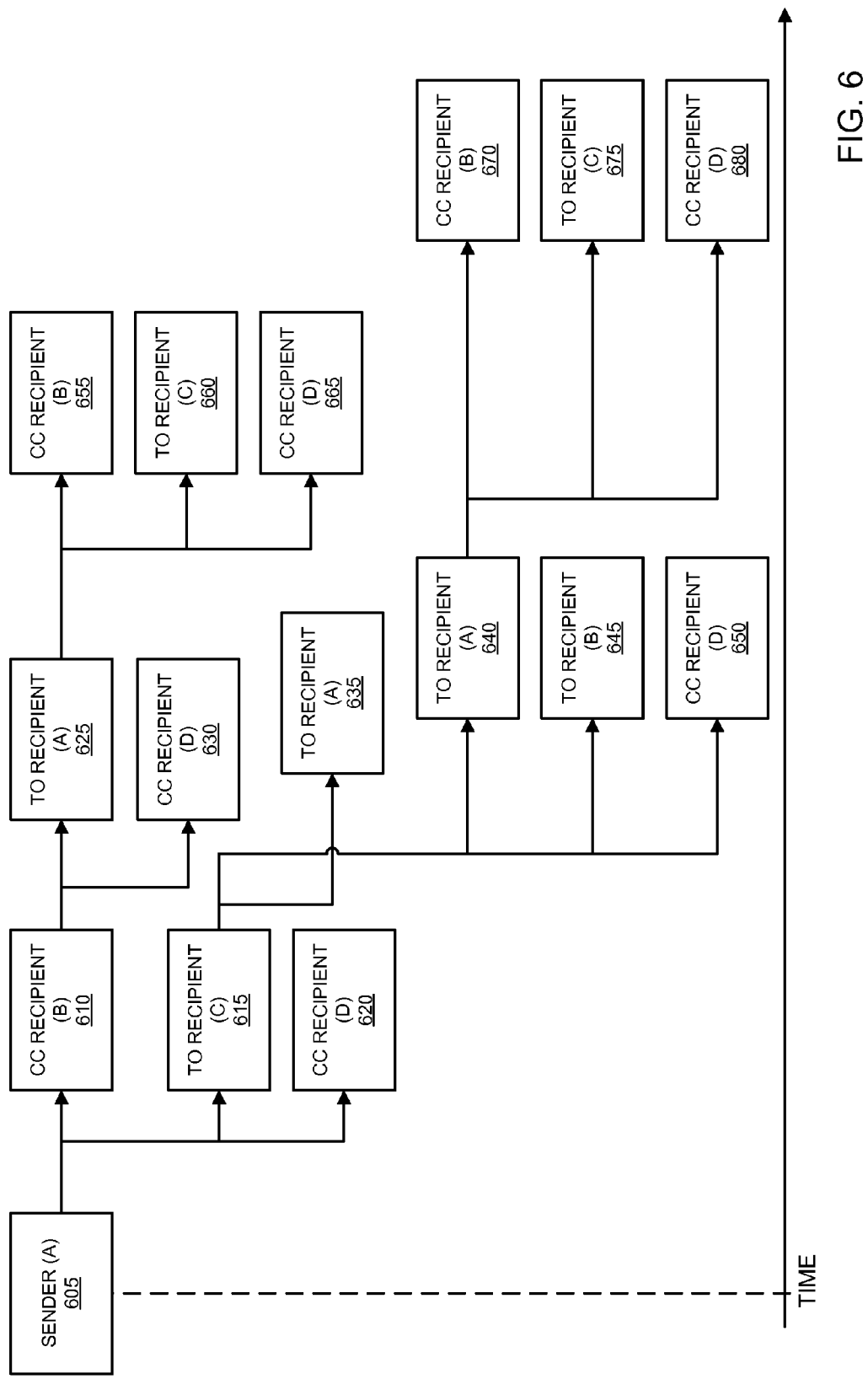
FIG. 6 is a block diagram illustrating an exemplary message sequence chart related to an e-mail thread.

FIG. 6 is a block diagram illustrating an exemplary message sequence chart related to an e-mail thread. An e-mail thread is a series or sequence of one or more e-mail messages that form a logical "discussion" or "communication." E-mail messages can be related by thread criteria, such as time, sender, topic, etc. An e-mail thread also can provide an indication of user interactions to an earlier or original e-mail message that initiated a discussion or communication formed by a series of e-mail messages. Typically, the e-mail that initiated the subsequent user interactions or communications is called a thread origin (e.g., e-mail message 605).

Referring to FIG. 6, a thread criterion defines an initial time starting indicative of when an e-mail message 605 was sent. As a result, the e-mail thread includes e-mail messages, transmitted during a time interval, that satisfy another thread criterion. In this example, computer system 300 determines e-mail messages that satisfy the thread criterion are e-mail messages related to the e-mail message 605 or otherwise transmitted in response to the e-mail message 605.

In this example, user (Sender) A composes e-mail message 605 to three users. The e-mail message 605 may be considered the origin of the e-mail thread illustrated in FIG. 6. User B receives e-mail message 610 as a carbon copy (CC) recipient. User C receives e-mail message 615 as a To-recipient. User D receives an e-mail message 620 as a CC-recipient.

In response to the e-mail message 610, the user B composes an e-message to users A and D. The user A receives e-mail message 625 as a To-recipient, and the user D receives e-mail message 630 as a CC-recipient. The user B may have forwarded or replied to the e-mail message 610 such that the e-mail messages 625 and 630 included the body text of the e-mail message 610 (in other words the original e-mail message 605). The e-mail messages 625 and 630 may also include the e-mail message 610 as an attachment, and include a similar subject as the e-mail message 610.

Next in the e-mail thread of FIG. 6, in response to the e-mail message 615, the user C composes an e-mail message to user A. The user A receives e-mail message 635 as a To-recipient. Subsequently, again in response to the e-mail message 615, the user C composes an e-mail to users A, B, and D. The user A receives e-mail message 640 as a To-recipient. The user B receives e-mail message 645 as a To-recipient. The user D receives e-mail message 650 as a CC-recipient.

After receiving the e-mail message 640, the user A composes an e-mail message to users B, C, and D in response to the e-mail message 625. The user B receives e-mail message 655 as a CC-recipient. The user C receives e-mail message 660 as a To-recipient. The user D receives e-mail message 665 as a CC-recipient.

Subsequently, in response to the e-mail message 640, the user A composes an e-mail message to users B, C, and D. The user B receives e-mail message 670 as a CC-recipient. The user C receives e-mail message 675 as a To-recipient. The user D receives e-mail message 680 as a CC-recipient.

Advantageously, computer system 300 allows a user or organization to discover information in e-mail messages that relates to discussions or communications about specific topics. Computer system 300 organizes the information, such as e-mail messages, into a thread and generates one or more topics in response to message attribute data associated with e-mail messages. Computer system 300 allows the user or organization to analyze the information to drive better business performance and/or comply with regulatory requirements.

Furthermore, computer system 300 allows the users and organizations to analyze properties of e-mail (such as recipients, replies, forwards, subject header, etc.), and combine the properties with organizational or corporate data to derive discussions and communication patterns within an organization or corporation. Computer system 300 provides access to electronic messages and message attribute data associated with the electronic messages. This allows users and organizations to quickly extract, analyze, and report information.

Derived Electronic Messages

As a result of user interactions in response to an e-mail message, subsequent e-mail messages may include quoted text from prior e-mail messages or include prior e-mail messages as attachments. Computer system 300 (FIG. 3) allows users or organizations to retrieve transactional e-mail messages from local e-mail repositories. Transactional e-mail messages are electronic messages that are received from and/ or stored on an e-mail server or in a file (e.g., one of the mail servers 117 of FIG. 1). A transactional message may include quoted text or attachments.

In various embodiments, computer system 300 processes the transactional e-mail messages to determine derived e-mail messages. Derived e-mail messages are electronic messages sent by electronic messaging services, where the electronic messages are included within other electronic messages. As described with respect to FIG. 4, some examples of derived e-mail messages are quoted text in forwarded or replied to e-mail messages, and e-mail messages included as attachments. For example, a transactional e-mail message may include a derived e-mail message. A benefit provided by various embodiments is that computer system 300 allows users and organizations to capture information in derived e-mail messages that otherwise may not have been retrieved from the local e-mail repositories as transactional e-mail messages.

As the use of electronic messaging proliferates, e-mails are often received from outside of organizations that initiate discussions or communications within the organization. Computer system 300 provides the users or organizations the ability to determine from derived e-mail messages whether discussions or communication originated from outside the organization. Additionally, computer system 300 allows the users or organizations to track whether topic discussion left or went outside the organization during a series of e-mail messages and later returned to an internal discussion within the organization.

In general, a system for processing e-mail messages (e.g., computer system 300 of FIG. 3) includes a processor and a communications interface. The communications interface receives, from an e-mail repository, a transactional e-mail message comprising message attribute data. The processor is coupled to the communications interface. As described above, the processor places the transactional e-mail message in an e-mail thread in response to the message attribute data of the transaction e-mail message. The processor then determines whether there is a derived e-mail message included in the transactional e-mail message. For example, if a derived e-mail messages such as a reply or forwarded message, is included in the transactional e-mail message, the processor determines derived message attribute data of the derived e-mail message. The processor then places the derived e-mail message in the e-mail thread in response to the derived message attribute data of the derived e-mail message.

Figure 7:
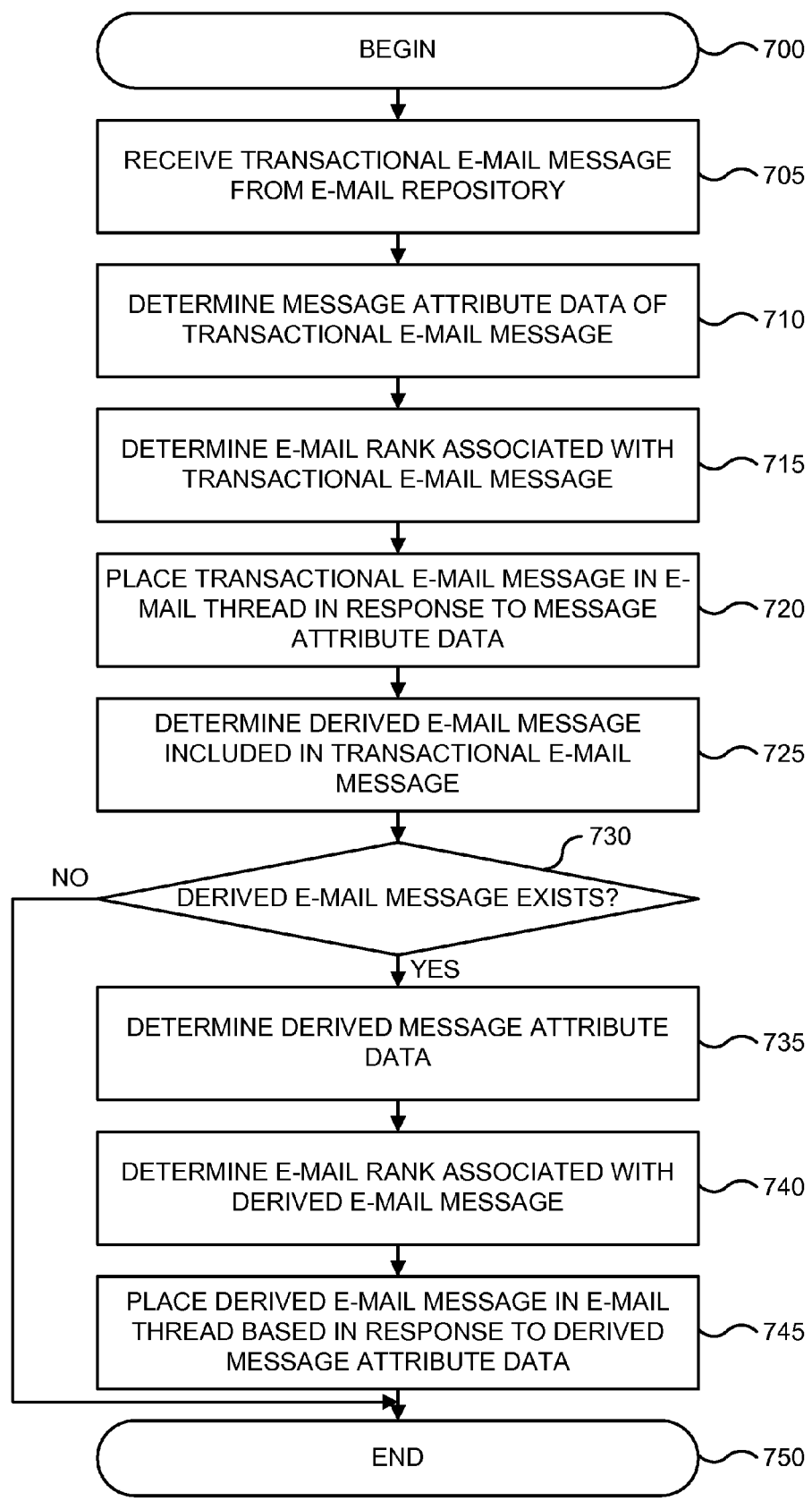
FIG. 7 is a flowchart for processing e-mail messages to determine derived e-mail messages in one embodiment according to the present invention.

FIG. 7 is a flowchart for processing e-mail messages to determine derived e-mail messages in one embodiment according to the present invention. FIG. 7 begins in step 700. In step 705, computer system 300 (FIG. 3) receives a transactional e-mail message from an e-mail repository. A transactional e-mail message is an e-mail message directly retrieved from an e-mail message repository, such as an e-mail server or an e-mail storage file (e.g., a PST file), as opposed to a derived e-mail message which generally is determined from a transactional e-mail message.

In step 710, computer system 300 determines message attribute data of the transactional e-mail message. Some examples of message attribute data are message content body, quoted text sections, attachments, signature sections, and message header information—such as a sender identifier, one or more recipient identifiers, the number of recipients, routing information, a subject line, a time stamp, and the like. In step 715, computer system 300 determines an e-mail rank associated with the transactional e-mail message. An e-mail rank is any quantitative value, symbol, or indicator associated with an e-mail message that is used to provide an indication of qualitative value, relevance, standing, degree, or position of the e-mail message.

In this example, computer system 300 determines a numerical value in response to the message attribute data for the e-mail rank associated with the transactional e-mail message. Computer system 300 may also assign the transactional e-mail message 3 or 4 stars out of 5 stars. Additionally, computer system 300 may also use external sources of information to determine the e-mail rank of e-mail messages. One exemplary method of determining an e-mail rank associated with e-mail messages is described with respect to FIGS. 8A and 8B.

In step 720, computer system 300 places the transactional e-mail message in an e-mail thread in response to the message attribute data. In step 725, computer system 300 determines whether a derived e-mail message is included in the transactional e-mail message. The derived e-mail message may be included in the transactional e-mail message as quoted text and as an attachment.

In step 730, if a derived e-mail message does not exist or is not included in the transactional e-mail message, the flowchart ends in step 750. Alternatively, if a derived e-mail message does exist or is included in the transactional e-mail message, the flowchart continues in step 735.

In step 735, computer system 300 determines derived message attribute data of the derived e-mail message. Some examples of derived message attributed data are a relationship with the transaction e-mail message (e.g., in-line, attached, forwarded, replied, etc.), derived message content body, quoted text sections, attachments, signature sections, and derived message header information—such as a sender identifier, one or more recipient identifiers, the number of recipients, routing information, a subject line, a time stamp, and the like.

In step 740, computer system 300 determines an e-mail rank associated with the derived e-mail message. In this example, computer system 300 determines the e-mail rank of the derived e-mail message in response to the derived message attribute data and the e-mail rank of the transactional e-mail message. In step 745, computer system 300 places the derived e-mail message in the e-mail thread, along with the transactional e-mail message, in response to the derived e-mail message data. FIG. 7 ends in step 750.

Ranking Electronic Messages

In various embodiments, computer system 300 processes e-mail messages (e.g., transactional e-mail messages and derived e-mail messages) to determine an e-mail rank associated with the e-mail message. A benefit provided by various embodiments is that computer system 300 allows users and organizations to sort, analyze, and process captured information in transactional and derived e-mail messages in response to e-mail ranks.

In general, a system (e.g., computer system 300 of FIG. 3) for ranking electronic messages includes a processor. The processor receives an e-mail message and determines a sender identifier associated with the e-mail message. The processor may also determine message attribute data in response to the e-mail message. The processor then determines an e-mail rank associated with the e-mail message in response to the sender identifier. The processor may determine the e-mail rank based on the message attribute data.

Figure 8A:
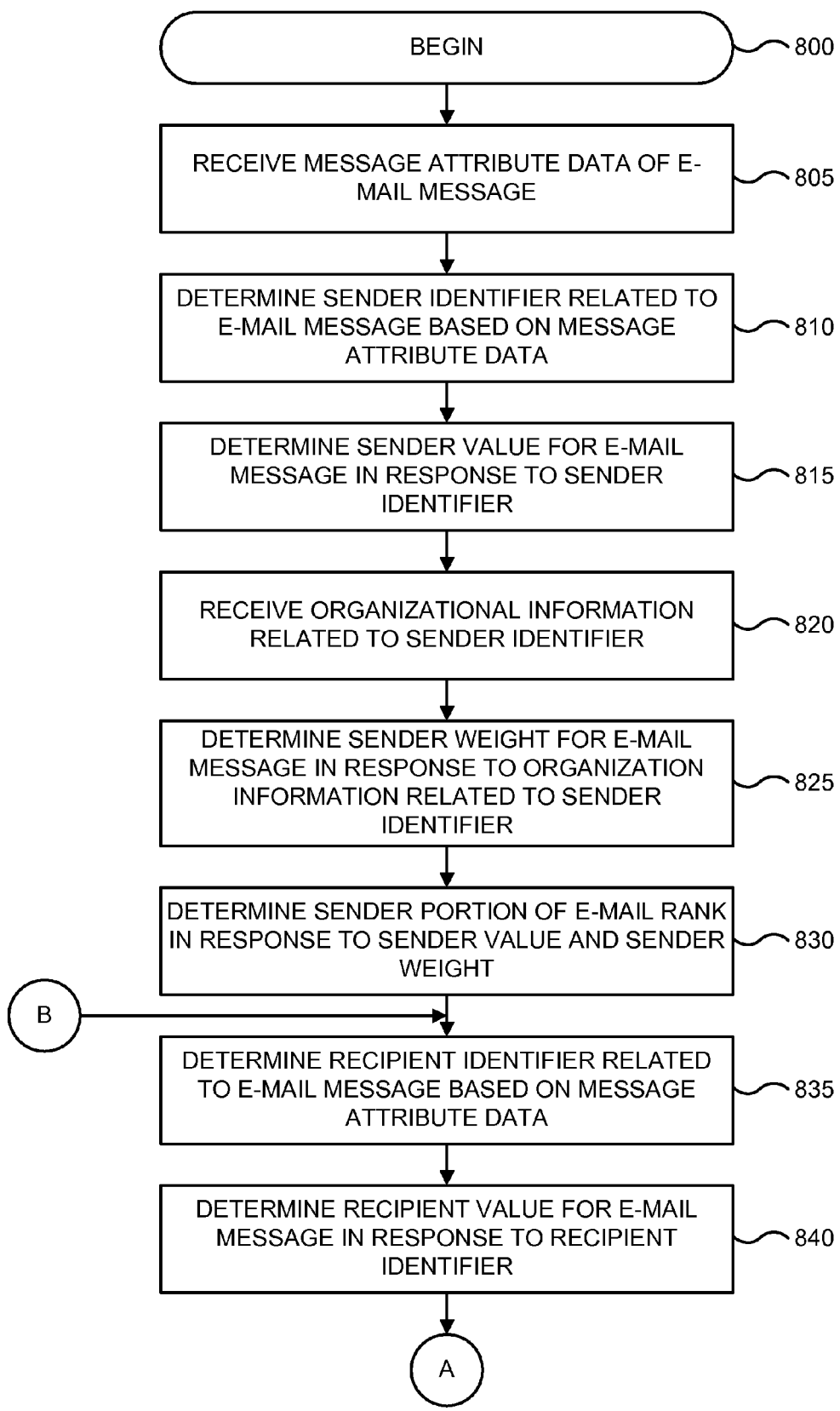
FIG. 8A and FIG. 8B are a flowchart for determining an e-mail rank associated with an e-mail message in one embodiment according to the present invention.
Figure 8B:
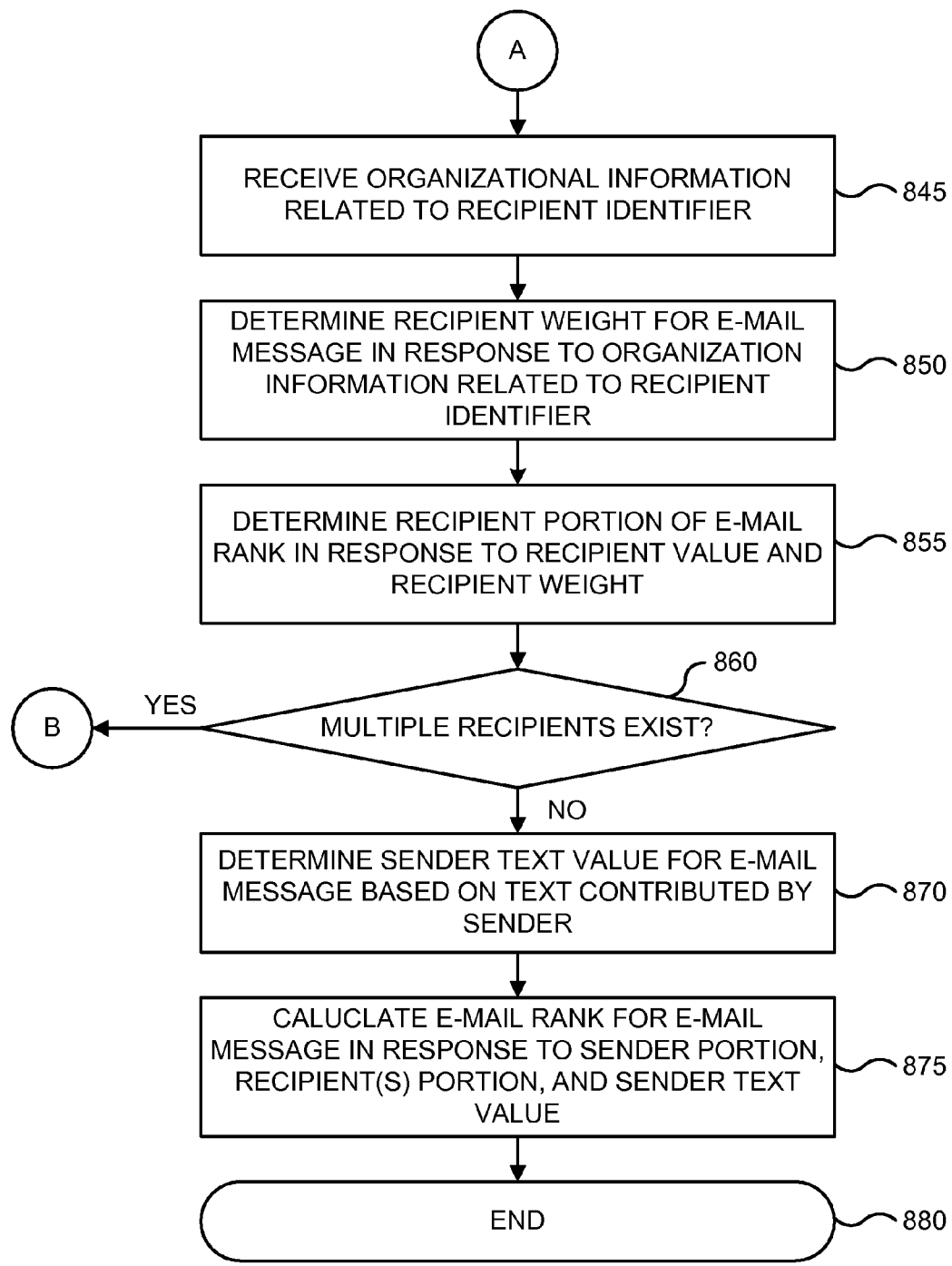

FIG. 8A and FIG. 8B are a flowchart for determining an e-mail rank associated with an e-mail message in one embodiment according to the present invention. FIG. 8A begins in step 800. In step 805, computer system 300 receives message attribute data of the e-mail message. In this example, the e-mail message can be a transactional e-mail message or a derived e-mail message.

In step 810, computer system 300 determines a sender identifier related to the e-mail message based on the message attribute data. Some examples of sender identifiers are Internet e-mail address (such as To, CC, and BCC), usernames, hostnames, last names, and first names. In step 815, computer system 300 determines a sender value for the e-mail message in response to the sender identifier.

In step 820, computer system 300 receives organizational data related to the sender identifier. For example, computer system 300 may determine that the sender identified is the CEO, CIO, CTO, President, and the like. In various embodiments, computer system 300 retrieves the organizational data from organizational or corporate directories, corporate organization charts, and the like. In step 825, computer system 300 determines a sender weight for the e-mail message in response to the organizational data related to the sender identifier. In step 830, computer system 300 determines a sender portion of the e-mail rank in response to the sender value and the sender weight.

In step 835, computer system 300 determines a recipient identifier related to the e-mail message based on the message attribute data. In step 840, computer system 300 determines a recipient value for the e-mail message in response to the recipient identifier.

Referring to FIG. 8B, in step 845, computer system 300 receives organizational data related to the recipient identifier. In step 850, computer system 300 determines a recipient weight for the e-mail message in response to the organizational data related to the recipient identifier. In step 855, computer system 300 determines a recipient portion of the e-mail rank in response to the recipient value and the recipient weight.

In step 860, if multiple recipients of the e-mail exist, the flowchart returns to step 835 to determine another recipient identifier. If no more recipient identifiers exist or recipient processing is otherwise terminated, the flowchart continues in step 870.

In step 870, computer system 300 determines a sender text value for the e-mail message based on text contributed by the sender. In one example, the entire e-mail message comprises original text contributed by the sender. In another example, the e-mail message comprises answers contributed by the sender and questions included in a previously received e-mail message. If no text is contributed, computer system 300 may determine the sender text value to be zero (0). For the more original text contributed, computer system 300 determines a larger sender text value.

In step 875, computer system 300 calculates the e-mail rank for the e-mail message in response to the sender portion, the recipient portion of one or more recipients, and the sender text value. Computer system 300 maps or otherwise associates the e-mail rank to the e-mail message. FIG. 8B ends in step 880.

In one embodiment, computer system 300 determines the e-mail message rank as a weighted average of a SenderValue, ToValue, and CCValue. For example, computer system 300 determines the e-mail rank (e.g., MessageRank) according to the following equation:

$$MessageRank = \frac{(SenderValue * SenderWeight) + (ToValue * ToWeight) + (CCValue * CCWeight)}{SenderWeight + ToWeight + CCWeight}$$

In this example, computer system 300 derives the SenderValue component using a weighted average of the sender's role (e.g., organizational role or corporate office) and the text contributed by the sender. Computer system 300 determines the value of the text contributed by the sender based on word frequency. Another example of determining e-mail rank is described in U.S. Provisional Application No. 60/761,500, filed Jan. 23, 2006 and entitled "E-Mail Threading, Ranking, Derivation and Topic Classification Methods and Apparatus."

Electronic Message Threading

In various embodiments, computer system 300 processes e-mail messages (e.g., transactional e-mail messages and derived e-mail messages) to determine "discussions" or "communications." These discussions or communications may be found in a series or sequence of e-mail messages. A benefit provided by various embodiments is that computer system 300 allows users and organizations to sort, analyze, and process captured information in transactional and derived e-mail messages into logical discussions or communications.

In general, a system (e.g., computer system 300 of FIG. 3) for threading of electronic messages includes a processor. The processor receives an e-mail message and determines message attribute data in response to the e-mail message. The processor then determines the position of the e-mail in an e-mail thread in response to the message attribute data.

Figure 9:
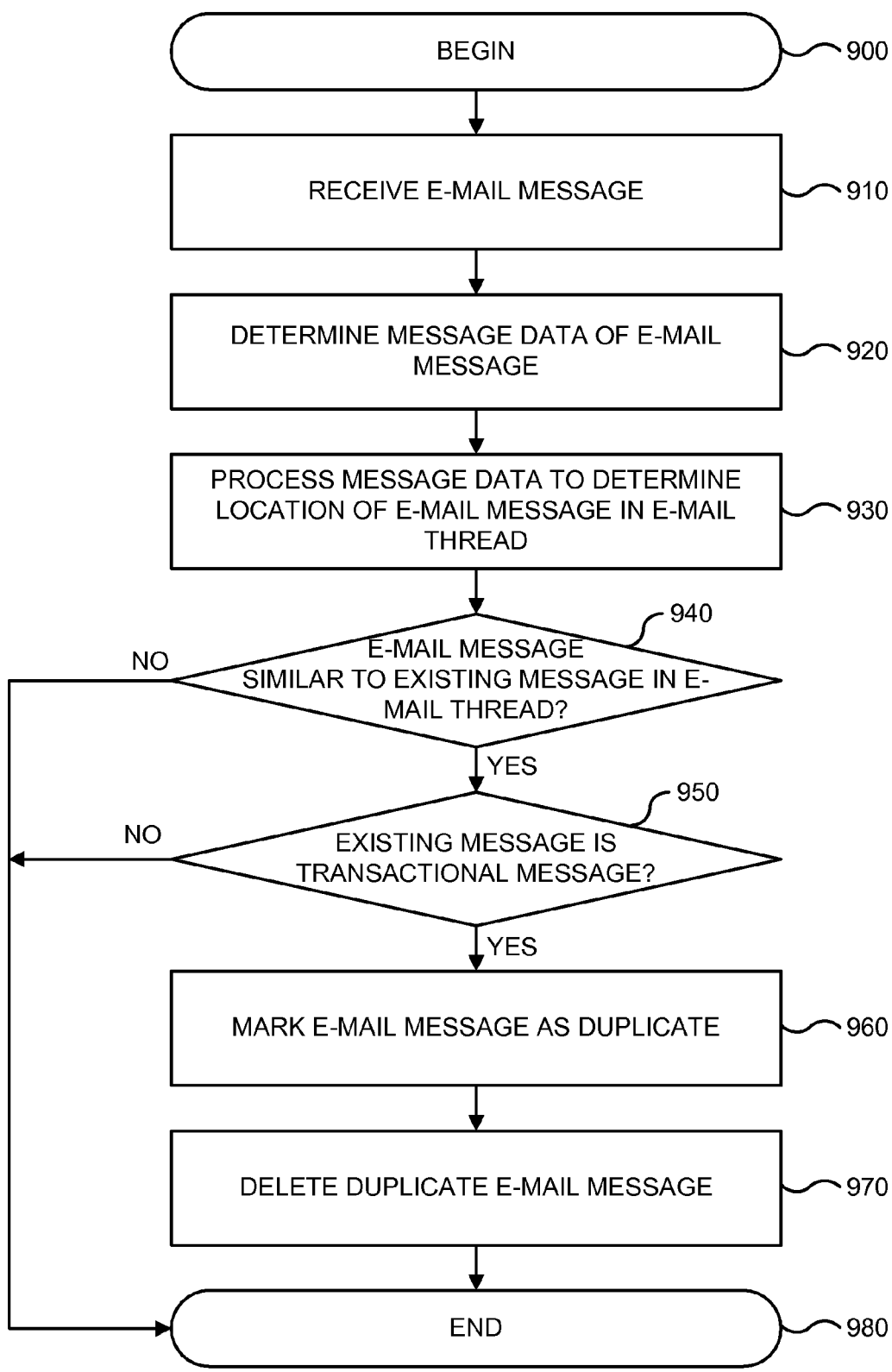
FIG. 9 is a flowchart for processing e-mail messages for placement in an e-mail thread in one embodiment according to the present invention.

FIG. 9 is a flowchart for processing e-mail messages for placement in an e-mail thread in one embodiment according to the present invention. FIG. 9 begins in step 900. In step 910, computer system 300 receives an e-mail message. In step 920, computer system 300 determines message attribute data of the e-mail message. In step 930, computer system 300 processes the message attribute data to determine a location of the e-mail message in an e-mail thread.

In step 940, computer system 300 determines whether the e-mail message is similar to an existing e-mail message in the e-mail thread. If the e-mail message is not similar to an existing e-mail message in the e-mail thread, FIG. 9 ends in step 980. Alternatively, if the e-mail message is similar to an existing e-mail message in the e-mail thread, the computer system 300 determines whether the existing e-mail message is a transactional e-mail message in step 950. In this example, computer system 300 provides deference to transactional e-mail messages, as opposed to derived e-mail messages whose message texts may have been altered during a reply or forward operation.

In step 960, computer system 300 marks the e-mail message as a duplicate. In step 970, computer system 300 deletes the duplicate e-mail message. FIG. 9 ends in step 980.

Figure 10A:
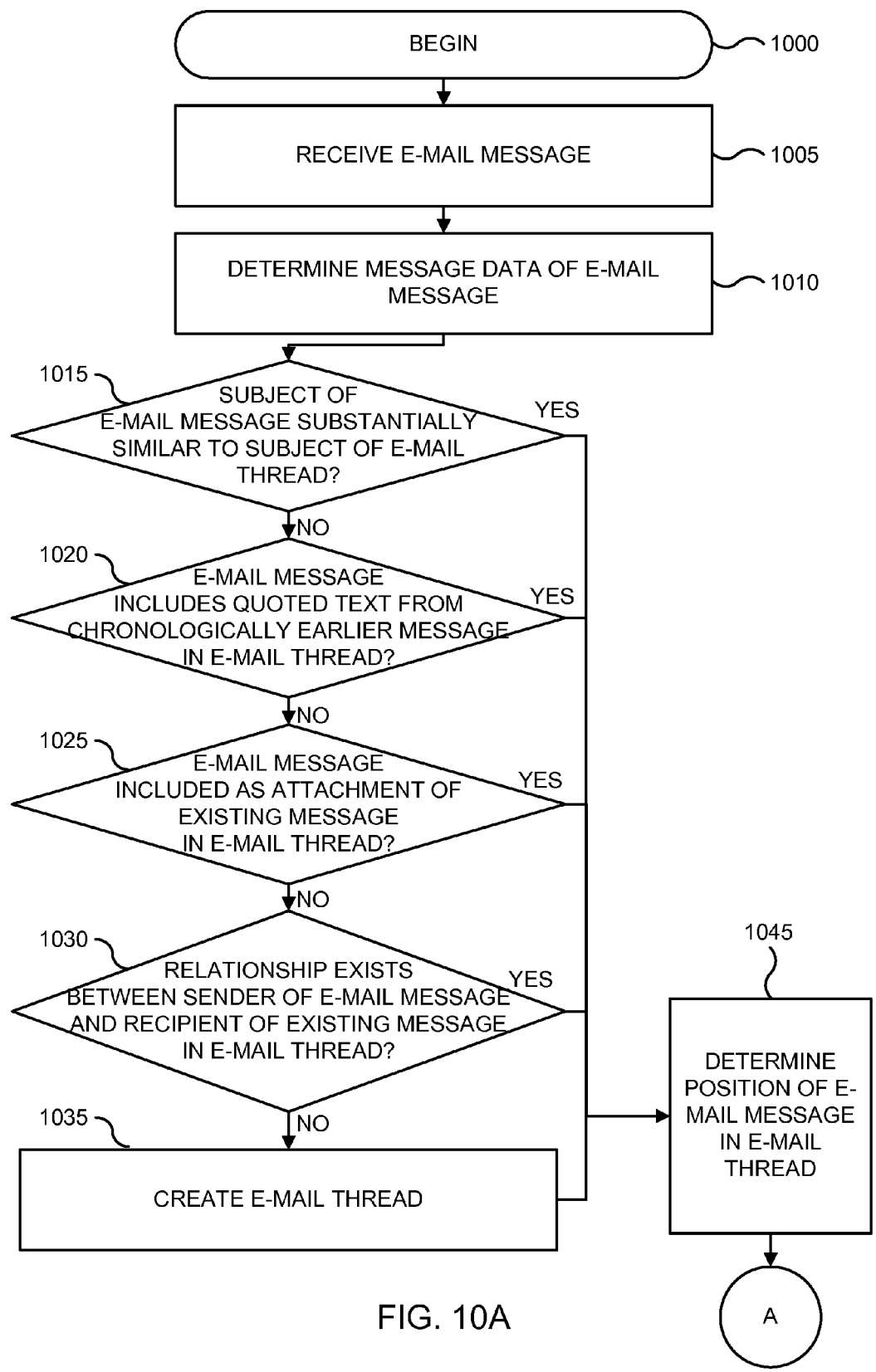
FIG. 10A and FIG. 10B are a flowchart for organizing an e-mail message in an e-mail thread in one embodiment according to the present invention.
Figure 10B:
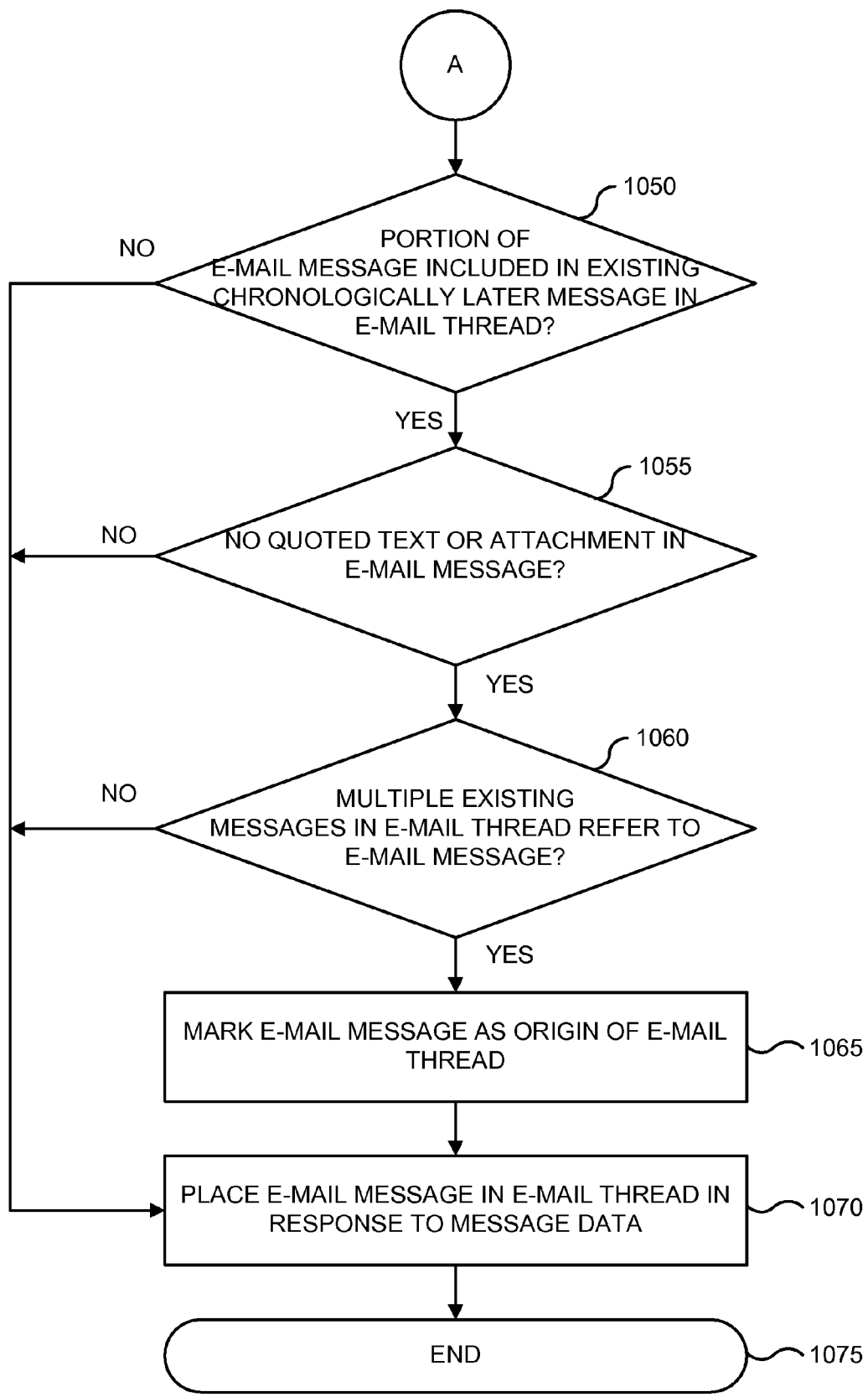

FIG. 10A and FIG. 10B are a flowchart for organizing an e-mail message, such as the e-mail message 640 from user C of FIG. 6, in an e-mail thread in one embodiment according to the present invention. FIG. 10A begins in step 1000. In step 1005, computer system 300 receives the e-mail message 640 (e.g., from one of the mail servers 117 of FIG. 1). In step 1010, computer system 300 determines message attribute data of the e-mail message 640, such as sender identifier, recipient identifier, subject, timestamps, and the like.

In step 1015, computer system 300 determines whether the subject of the e-mail message 640 (e.g., from the message attribute data) is substantially similar to the subject of an e-mail thread. If the subjects are not similar, in step 1020, computer system 300 determines whether the e-mail message 640 includes quoted text from a chronologically earlier e-mail message in the e-mail thread (e.g., text from e-mail messages 615). If the e-mail message 640 does not include quoted text, computer system 300 determines whether the e-mail message 640 is included as an attachment of an existing e-mail message in the e-mail thread (e.g., in e-mail messages 670, 675, or 680) in step 1025.

If the e-mail message 640 is not included as an attachment, in step 1030, computer system 300 determines whether a relationship exists between a sender of the e-mail message 640 and a recipient of an existing e-mail message in the e-mail thread (e.g., with the e-mail message 615, 670, 675, and 680). If computer system 300 makes a negative determination in each of the steps 1015, 1020, 1025, and 1030, computer system 300 creates a new e-mail thread with the subject of the e-mail message 640 in step 1035. If computer system 300 makes a positive determination in any of the steps 1015, 1020, 1025, and 1030, computer system 300 proceeds to determine the position of the e-mail message 640 within the corresponding e-mail thread in step 1045.

Referring to FIG. 10B, in step 1050, computer system 300 determines whether a portion of the e-mail message 640 is included in a chronologically later e-mail message in the e-mail thread, for example in the e-mail messages 670, 675, or 680. If a positive determination is made, computer system 300 determines whether there is no quoted text or attachments (such as would indicate an earlier derived e-mail message) in the e-mail message 640 in step 1055. If another positive determination is made, computer system 300 determines whether multiple existing e-mail messages in the e-mail thread refer to the e-mail message 640 in step 1060.

If computer system 300 makes a positive determination in the steps 1050, 1055, and 1060, computer system 300 marks the e-mail message 640 as an origin of the e-mail thread. In general, the origin of an e-mail thread is an e-mail message that initiated the sending of subsequent e-mail messages forming a logical discussion or conversation. Typically, the subsequent e-mail messages have similar subjects as the origin e-mail address or refer to the origin e-mail message. The subsequent e-mail messages may also include all or a portion of the original e-mail address as quoted text or as an attachment.

In step 1070, computer system 300 places the e-mail message 640 in the e-mail thread in response to the message data. If the computer system makes a negative determination in the steps 1050, 1055, and 1060, computer system 300 places the e-mail message 640 in the e-mail thread in response to the message attribute data. If the computer system makes a positive determination in the steps 1050, 1055, and 1060, computer system 300 places the e-mail message as the origin of the e-mail thread.

In this example, computer system 300 places the e-mail message 640 chronologically before the e-mail messages 670, 675, and 680. Computer system 300 identifies the relationships between the e-mail messages 640, 670, 675, and 680, such as between sender and recipient, quoted text, attachments, and the like. Computer system 300 places the e-mail message 640 chronologically after the e-mail message 615. Computer system 300 identifies the relationships between the e-mail messages 615 and 640.

In various embodiments, as computer system 300 incrementally receives e-mail messages, the e-mail message may not be received in chronological order, or any order for that matter. In response, computer system 300 may continuously "promote" or "demote" processed e-mail messages as the origin of an e-mail thread. Computer system 300 may continuously organize the e-mail thread in response to processed e-mail messages, altering relationships and updating the positions of e-mail messages in the thread in response to message attribute data of the e-mail messages. FIG. 10B ends in step 1075.

Ordering of Electronic Message Threads

In various embodiments, computer system 300 processes e-mail threads (e.g., transactional e-mail messages and derived e-mail messages) to determine an ordering associated with the e-mail threads. A benefit provided by various embodiments is that computer system 300 allows users and organizations to sort, analyze, and process captured information in transactional and derived e-mail messages into e-mail threads that may be ordered based on different criteria, such as time, topic, rank, and relevance.

In general, a system (e.g., computer system 300 of FIG. 3) for ranking electronic messages includes a processor. The processor receives a plurality of e-mail messages and determines a plurality of e-mail threads in response to the plurality of e-mail messages. The processor determines an e-mail rank associated with each e-mail message in the plurality of e-mail threads. The processor determines an e-mail rank associated with an e-mail message in response to a sender identifier related to the e-mail message.

The processor determines a thread rank for each e-mail thread in the plurality of e-mail threads. The processor determines a thread rank associated with an e-mail thread in response to e-mail ranks of each e-mail message associated with each respective e-mail thread. The processor then determines an ordering of the plurality of e-mail threads in response to the thread rank associated with each e-mail thread in the plurality of e-mail threads.

Figure 11:
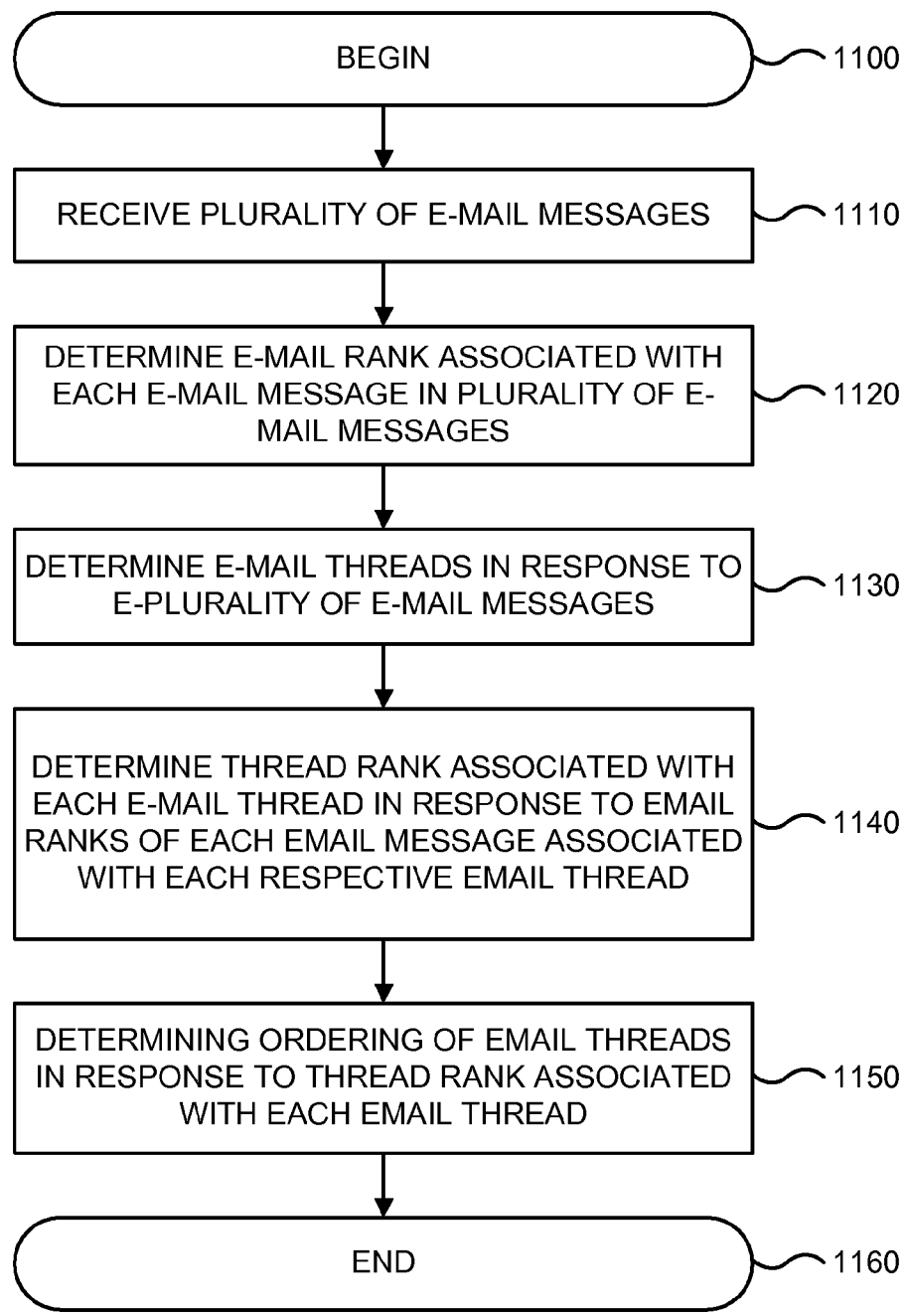
FIG. 11 is a flowchart for ordering e-mail threads in one embodiment according to the present invention.

FIG. 11 is a flowchart for ordering e-mail threads in one embodiment according to the present invention. FIG. 11 beings in step 1100. In step 1110, computer system 300 receives a plurality of e-mail messages. In step 1120, computer system 300 determines the e-mail rank associated with each e-mail message in the plurality of e-mail messages.

In step 1130, computer system 300 determines e-mail threads in response to the plurality of e-mail messages. In step 1140, computer system 300 determines a thread rank associated with each e-mail thread in response to e-mail ranks of each e-mail message associated with each respective e-mail thread. In one example, the thread rank is a weighted average of the e-mail ranks associated with the e-mail message in an e-mail thread.

In step 1150, computer system 300 determines an ordering of the e-mail threads in response to the thread ranks of each e-mail thread. Computer system 300 then may display the ordering to a user or generate a report containing the ordering. The ordering of e-mail threads allows a user or organization to determine which communications or conversations embodied in e-mail threads are most active or most relevant to a topic or other search criteria. FIG. 11 ends in step 1160.

Advantageously, computer system 300 can display the ordering of the e-mail thread to a user. For example, computer system 300 can provide the user with an ordering of e-mail threads based on a search performed for discussions or communications related to organization trade secrets. In another example, computer system 300 displays an ordering of the most active or highly discussed topics or categories in an organization.

Figure 12:
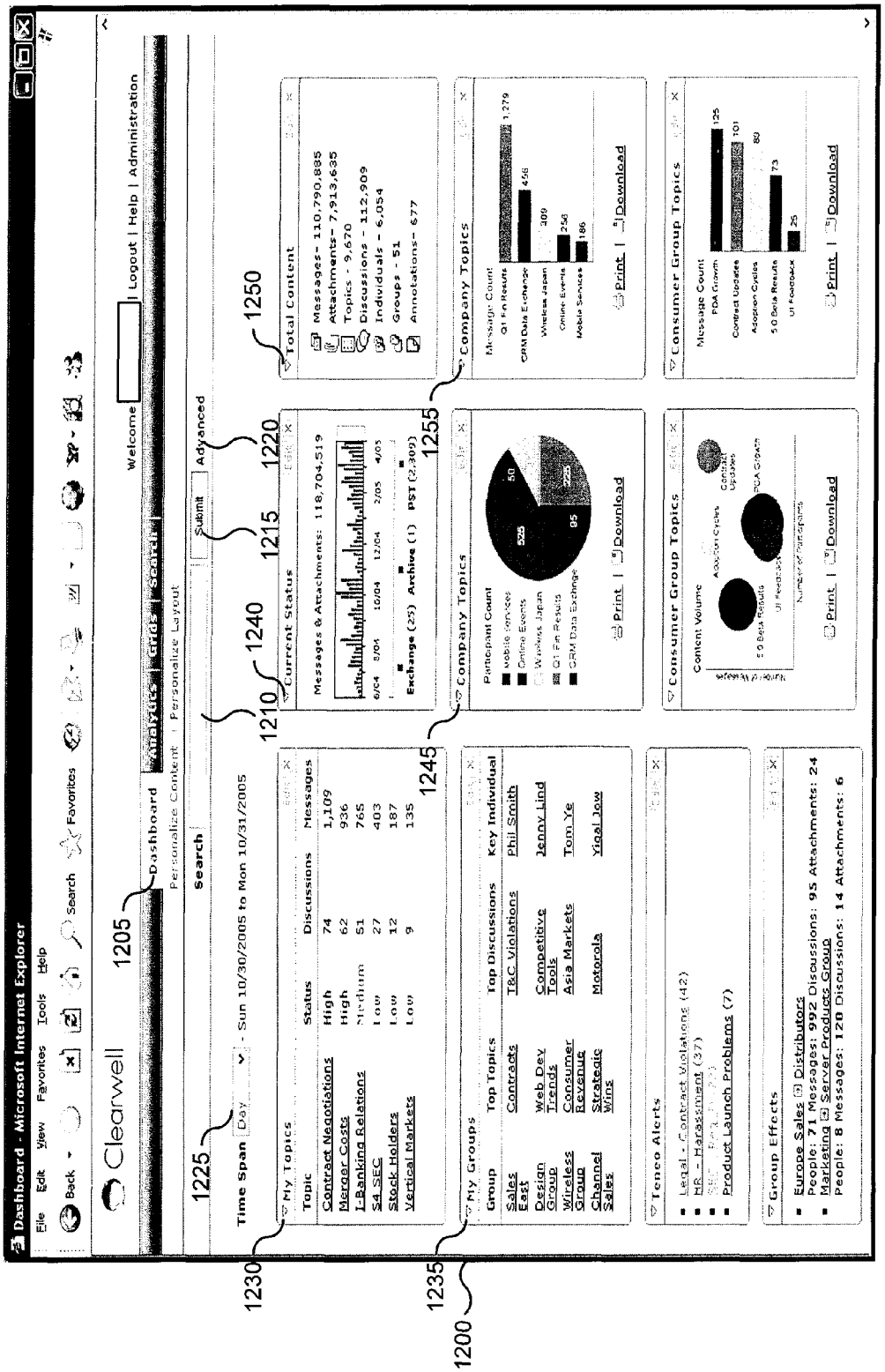
FIG. 12 is a screenshot of an exemplary dashboard displaying information related to processing of e-mail messages in one embodiment according to the present invention.

FIG. 12 is a screenshot 1200 of an exemplary dashboard 1205 displaying information related to processing of e-mail messages in one embodiment according to the present invention. The dashboard 1205 includes a search box 1210, a search submit button 1215, an advanced search button 1220, a time span interface 1225, a personalized topic display portion 1230, a group display portion 1235, a current status display portion 1240, a participants/topic display portion 1245, a total content display portion 1250, and a message/topic display portion 1255.

In this example, the search box 1210 allows a user to enter search criteria and click the search submit button 1215 to search information processed by the system 100 (FIG. 1). The user may click the advanced search button 1220 to enter a dialog (not show) provided additional search function features. The retrieved search results may be displayed in the dashboard 1205 or in a new display window. Additionally, the time span interface 1225 allows the user to enter day and time information to restrict the information displayed by the dashboard 1205.

The personalized topic display portion 1230 depicts topics of interest to the user. The topic may be arranged in the personalized topic display portion 1230 according to topic alphabetical order, topic status, the number of discussions related to a particular topic, and the number of messages related to a particular topic, as illustrated. The group display portion 1235 depicts groups in an organization and the top or most active topics, discussions, and key individuals associated with a topic, as illustrated.

The current status display portion 1240 depicts the current status of the system 100, such as the number of e-mail messages and attachments in the master index 105, and the number of messages retrieved from an e-mail server, an archive, and a PST file, as illustrated. The participants/topic display portion 1245 depicts the number of participants for a particular topic. For example, the top five topics and the number of participants associated with each of the top five topics may be displayed by a pie chart. Each topic may be displayed using a different color, as illustrated.

The total content display portion 1250 depicts the number of e-mail messages, the number of attachments, the number of topics, the number of discussions, the number of individuals, the number of groups, and the number of annotations in the master index 105, as illustrated. A unique or descriptive icon may represent each portion of the content in the master index. The message/topic display portion depicts the message count associated with a particular topic. In this example, the screenshot 1200 depicts a bar chart for the message count of five topics. In some embodiments, the dashboard 1205 includes links for printing or downloading information presented on the dashboard.

Figure 13:
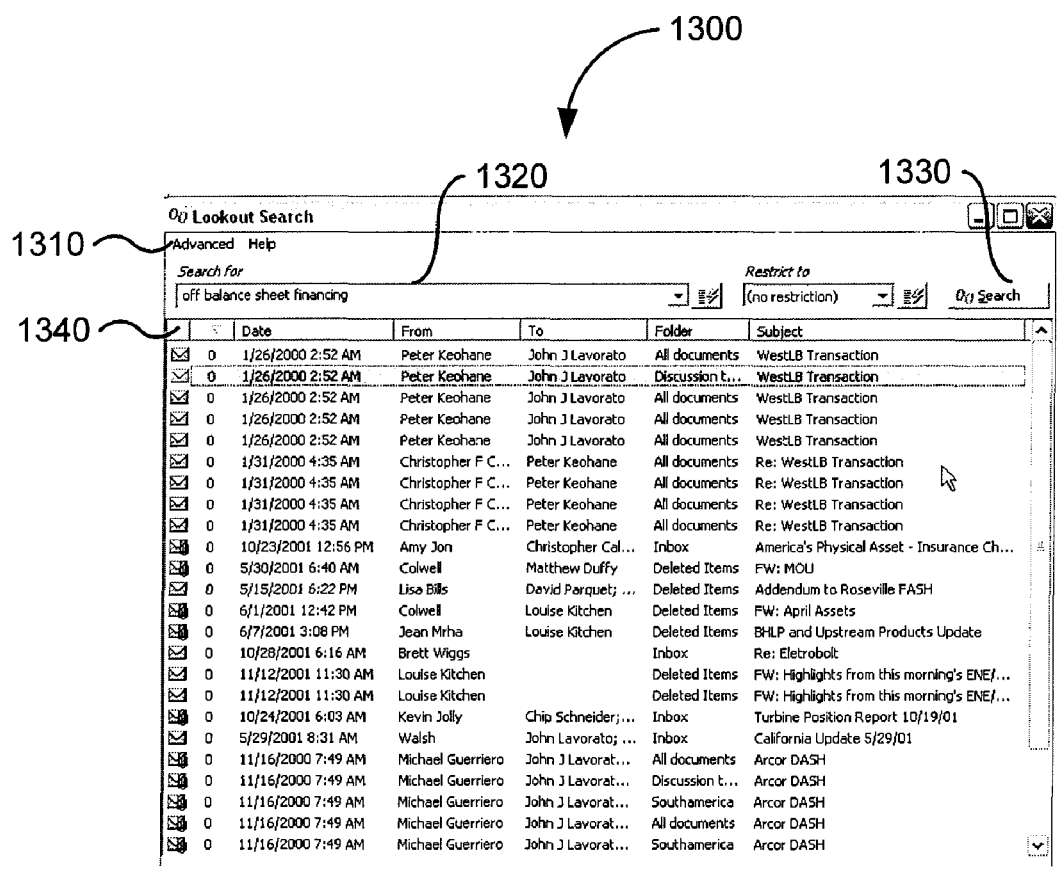
FIG. 13 is a screenshot of an exemplary search dialog displaying information related to e-mail messages in one embodiment according to the present invention.

FIG. 13 is a screenshot 1300 of an exemplary search dialog 1310 displaying information related to e-mail messages in one embodiment according to the present invention. The e-mail message search dialog 1310 includes a search box 1320, a search button 1330, and a search listing 1340. The search box 1320 allows a user to enter search terms to search information processed by the system 100. The search button 1330 submits the search terms to the e-mail processing system (e.g., the analytics ETL 116).

The search listing 1340 displays the information retrieved from the master index 105, as illustrated. In this example, the search listing 1340 displays whether an e-mail message includes an attachment, a time stamp, a sender identifier ("From"), a recipient identifier ("To"), a location or folder identifier, and a subject. In some embodiments, the search listing 1340 displays the e-mail messages sorted by a subject, a sender identifier, and/or an e-mail rank, as illustrated, as well as by other information desired by the user.

Electronic Message Search and Retrieval

In various embodiments, a query engine component (e.g., query engine 216 of FIG. 2) performs an optimized retrieval of e-mail search hits and other assets of e-mails. Typically, in order to perform optimized retrieval of e-mail and other assets associated with e-mails, e-mail documents are indexed first using crawler and indexer components as discussed with respect to FIGS. 1 and 2. The crawler acquires raw e-mails from e-mail repositories, such as Microsoft Exchange, using a communication protocol such as Microsoft Exchange MAPI, or Internet RFC 2822 e-mail message format.

In some embodiments, an e-mail index (e.g., master index 105 of FIG. 1) is created using the crawler and indexer components and stored in two forms: a full-text index containing searchable content organized in a way that helps in fast retrieval (e.g., e-mail full-text index 165 of FIG. 1) and a set of relational tables containing e-mail meta-data and search information (e.g., e-mail tables 160 of FIG. 1). The query engine component enables efficient retrieval of relevant search results from the e-mail index using one or a combination of the full-text index and the set of relational tables.

Figure 14:
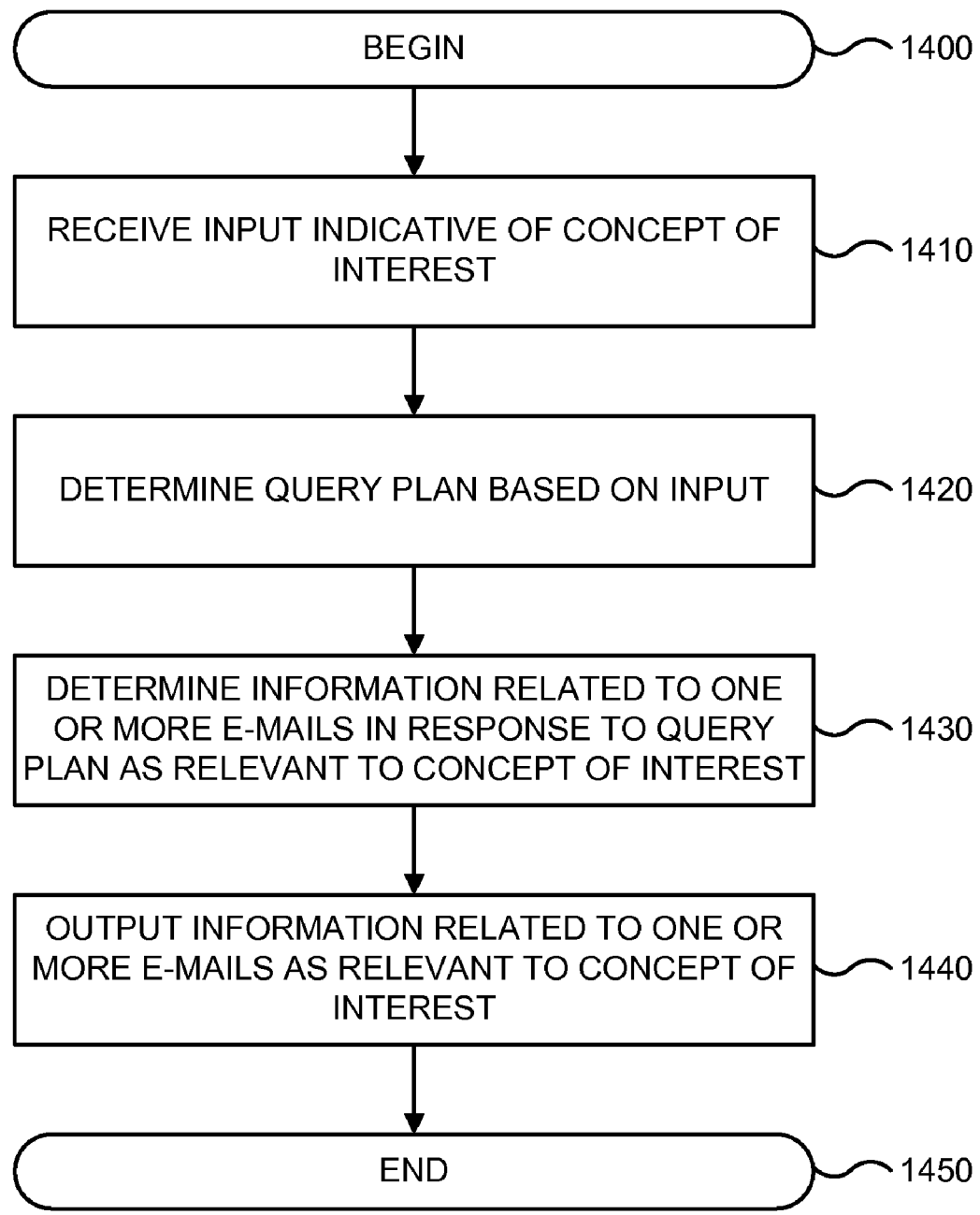
FIG. 14 is a flowchart of a method for e-mail searching and retrieval in one embodiment according to the present invention.

FIG. 14 is a flowchart of a method for e-mail searching and retrieval in one embodiment according to the present invention. The processing depicted in FIG. 14 may be performed by software modules (e.g., instructions or code) executed by a processor of a computer system, by hardware modules of the computer system, or combinations thereof. FIG. 14 begins in step 1400.

In step 1410, computer system 300 receives input indicative of a concept of interest. For example, a searcher may input a name, an e-mail address, a topic, a keyword, and the like. The input may include natural language forms, structured language queries, Boolean logic, wildcards, and the like.

In step 1420, computer system 300 determines a query plan based on the input. For example, computer system 300 may determine which databases to search (e.g., e-mail tables 160, full-text index 165, etc.). In another example, computer system 300 may determine when to present initial results to the searcher, and the relevancy of those initial results.

In step 1430, computer system 300 determines information related to one or more e-mails in response to the query plan as relevant to the concept of interest. Computer system 300 may retrieve the entire contents on e-mail documents, a portion of an e-mail documents, attachments, quoted-text, header information, and the like.

In step 1440, computer system 300 outputs the determined information related to the one or more e-mails as relevant to the concept of interest. For example, computer system 300 may display the results to the search using a graphical user interface. Computer system 300 may present the information to another computer process, such as in XML format, for further processing. In some embodiments, computer system 300 outputs a portion of the information for nearly instant display to a searcher, while continuing or updating the information in the background. FIG. 14 ends in step 1450.

Figure 15:
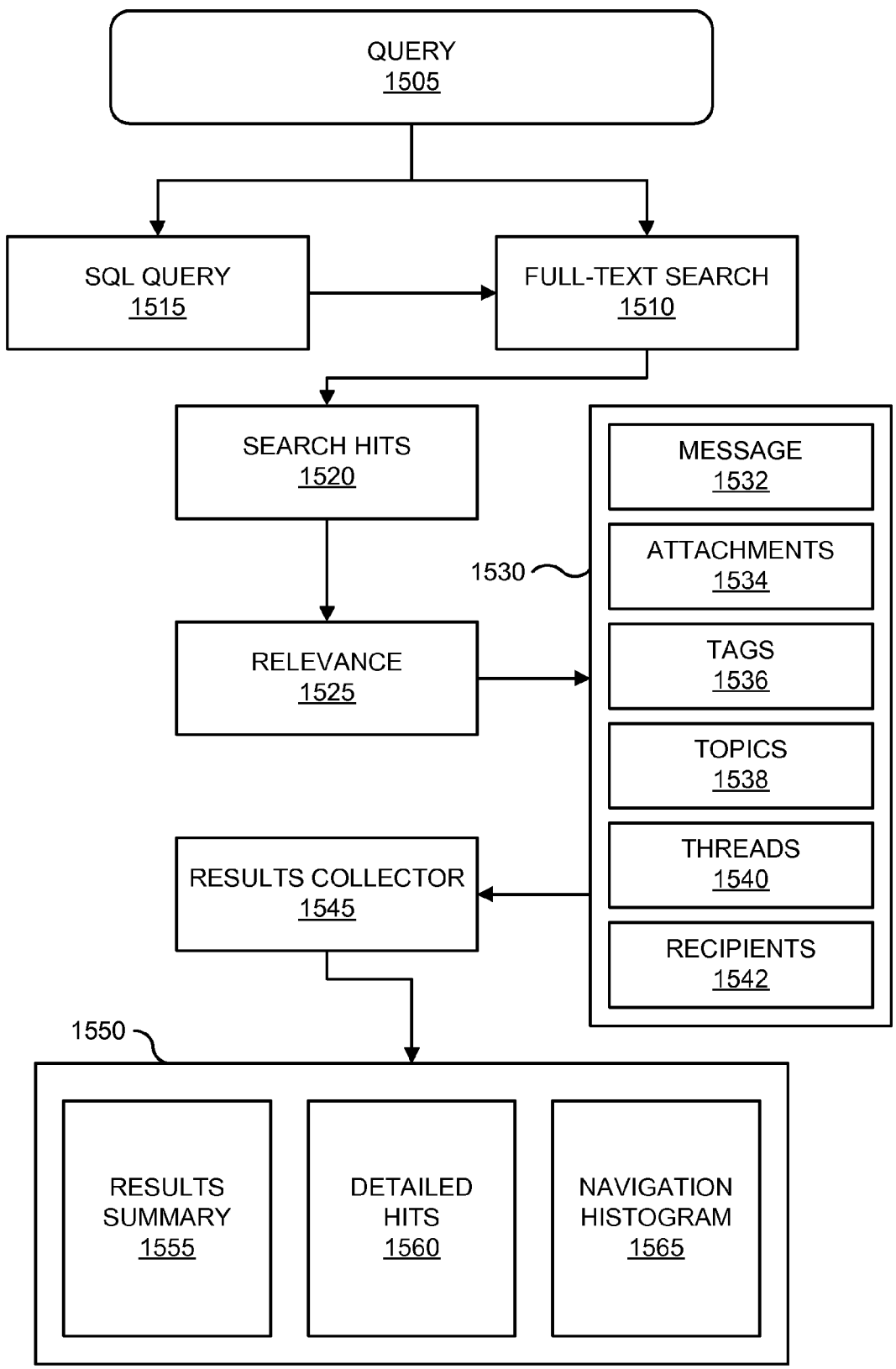
FIG. 15 is a block diagram illustrating e-mail search and retrieval in one embodiment according to the present invention.

FIG. 15 is a block diagram illustrating e-mail search and retrieval in one embodiment according to the present invention. In this example, a set of e-mail database tables (e.g., e-mail tables 160 of FIG. 1) track various properties of e-mails, documents, attachments, e-mail senders, recipients, e-mail domains, departments, and the like. Indexer 130 of FIG. 1 analyzes the content portion of an e-mail and constructs an index (e.g., e-mail full-text index 165 of FIG. 1). As discussed above, one of the first steps in content analysis is called "surface analysis," which identifies various regions of e-mail documents.

Figure 16:
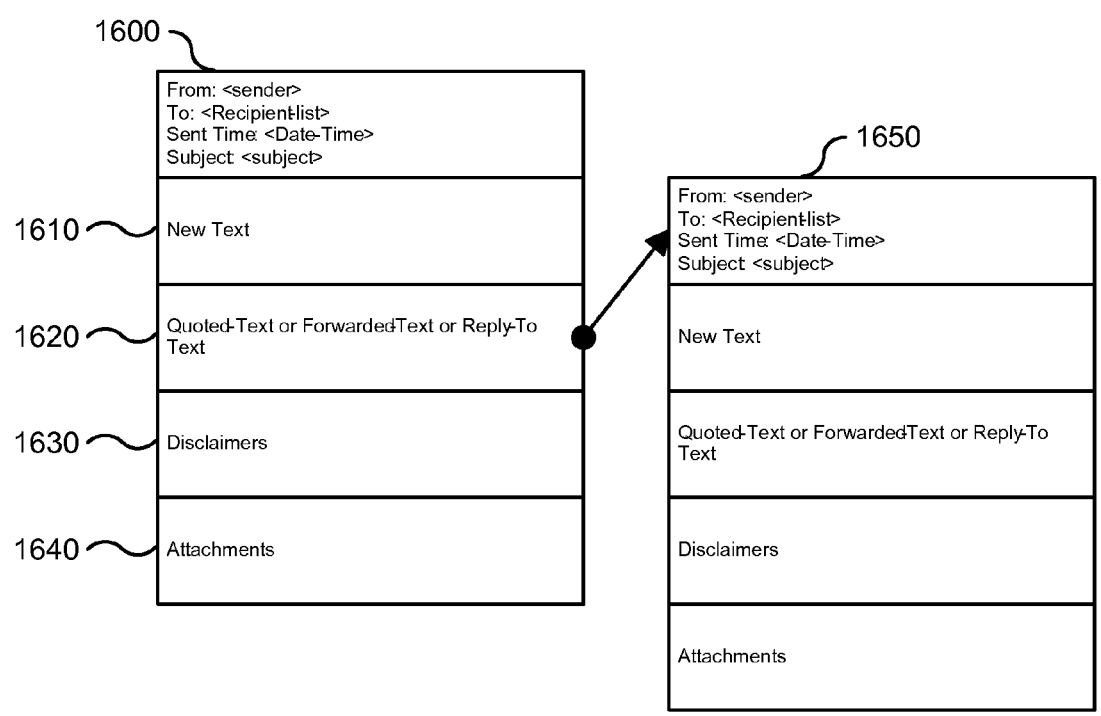
FIG. 16 is a block diagram of contents of an e-mail message in one embodiment according to the present invention.

FIG. 16 is a block diagram of contents of an e-mail message 1600 in one embodiment according to the present invention. In this example, the content portion (e.g., the non-header portion) e-mail document 1600 includes a new text portion 1610, a derived e-mail portion 1620, a disclaimer portion 1630, and an attachment portion 1640. Derived e-mail portion 1620 may include text quoted from another e-mail document, forwarded from another e-mail document, and reply-to text. Derived e-mail portion 1620 may include a content portion of another e-mail document 1650, with new text, quoted-text, forward text, reply-to text, disclaimers, attachments, and the like. The following are some examples of regions of an e-mail that may be identified:

| Region | Description |
|---|---|
| FromList | The list of e-mail addresses from which an e-mail is sent. |
| ToList | The list of e-mail addresses to which an e-mail is sent. |
| CcList | The list of e-mail addresses from which an e-mail is carbon-copied. |
| BccList | The list of e-mail addresses from which an e-mail is blind-carbon-copied. |
| SentDateTime | Time when an e-mail was sent. |
| Importance | Importance flags on e-mail. |
| Subject | Subject of an e-mail, with its tokens stemmed to remove word inflections and endings. |
| Unstemmed Subject | Subject of an e-mail, with its tokens in raw form. |
| E-mailScope | Internal to a domain or external to a domain. |
| NewText | The New Text content of an e-mail, with its tokens stemmed to remove word inflections and endings. |
| UnstemmedNewText | The New Text of an e-mail in raw form. |
| Attachment | Contents of an attachment, with its tokens stemmed to remove word inflections and endings. |
| UnstemmedAttachment | Contents of an attachment in raw form. |
| QuotedText | The Quoted or Included text, with its tokens stemmed to remove word inflections and endings. |
| UnstemmedQuotedText | The Quoted or Included text in raw form. |

In various embodiments, for each of the regions above, the full-text index contains a list of all tokenized words. The full-text index may also include a list of each document containing a word, along with the location information for each word. This list may be an inverted word index.

Referring again to FIG. 15, in this example, a query 1505 is received from a searcher. In general, a searcher may be a user, administrator, or other computer process. In various embodiments, when a search request is processed (e.g., query 1505), the search request is converted into tokens. For example, search request containing the phrase "Pirates of the Caribbean" may be tokenized into terms: "pirate" and "Caribbean."

The following are some exemplary forms of search for the above phrase:

| Search Type | Mode | Description |
|---|---|---|
| All-Of-The-Words | Unstemmed | Contain all tokenized terms except for common words such as "of" and "the", with each term not stemmed. |
| All-Of-The-Words | Stemmed | Remove inflections and word endings and search for all of the words, except for common words such as "of" and "the". |
| Any-Of-The-Words | Unstemmed | Contain any of the tokenized terms, with each term not stemmed, except for common words such as "of" and "the". |
| Any-Of-The-Words | Stemmed | Remove inflections and word endings and search for any of the words, except for common words such as "of" and "the". |
| None-Of-The-Words | Unstemmed | Contain none of the tokenized terms, with each term not stemmed, except for common words such as "of" and "the". |
| None-Of-The-Words | Stemmed | Remove inflections and word endings and search for e-mails that contain none of the words. |
| Phrase | Unstemmed | Match exact phrase, including commonly occurring words such as "of" and "the". The order of the words in the phrase is important. |

In step 1510, the tokens are searched against a full-text search (e.g., full-text index 165 of FIG. 1). In step 1520, a set of search hits is retrieved from the full-text search. In various embodiments, in addition to the token based search retrieval of the full-text index, in step 1515, results from relational queries (such as a SQL query) are combined with results from the full-text search hits in step 1515. For certain types of queries, computer system 300 may determine that using a relational query is more suitable for determining search hits in step 1520. The following are certain exemplary parameters that may be used for the determination:

| Item | Reason |
|---|---|
| Date Range | For queries that involve a Date Range (E-mail Sent-Time), it may not be possible to construct a searchable full-text index. Relational databases provide a well-established SQL Query interface to search date ranges. |
| Access Control | Access Control is usually a post-indexing determinant task. Full-text indexes typically provide Insert-Only methods, whereas SQL can provide update capabilities. |
| Group Membership | Groups are collections of individuals in an organization, reflecting the organizational and communication groups to which individuals belong. Group membership involves determining e-mail senders and recipients, and determining groups to which they belong. A single e-mail can belong to multiple groups. The nature of group membership definition is that it is very dynamic, and subject to change after initial representation/definition. This tends toward the use of a relational database with SQL Queries to generate potential search results. |

In step 1525, relevance is determined. In general, when a search is performed against a large body of e-mails, very large number of results will be produced. These results need to be ordered, so that the most relevant e-mails are returned. In step 1530, the results may be ordered based on attributes and criteria, such as messages 1532, attachments 1534, tags 1456, topics 1538, threads 1540, and recipients 1542.

In various embodiments, relevance may be determined by a scoring formula that involves the attributes, such as term frequency, the field boost, the inverse document frequency, and field length normalization factors, and the like. In various embodiments, term frequency is the number of times a search term appears in a particular e-mail document. The more times a search term appears, the greater the importance of that e-mail, relative to other e-mails. Inverse document frequency is the number of documents a particular term is found in. The more documents a term is found in, the less important that term is in selecting the e-mail as an important result. Field length normalization indicates that if a term appears in a field that contains many other terms, the importance of the term is lower. If a field contains only a small number of terms, and the search term is one of them, that field contributes more to the relevance.

In some embodiments, a relevance score is computed for each e-mail according to the following formula:

For a collection of documents D, a specific document d, and a set of tokens within a region, q containing $t_i$ individual terms, the score for the document is:

$$s(q,d) = \sum_{t \in q} \frac{tf_{t,q} * idf_t}{norm_q} * \frac{tf_{t,d} * idf_t}{norm_d} * coord_{q,d} * weight_t$$

where $$tf_{t,X} = \sqrt{freq(t,X)}$$

$$idf_t = 1 + \log\frac{|D|}{freq(t,D)}$$

$$norm_d = \sqrt{|d|}$$

$$coord_{q,d} = \frac{|q \cap d|}{|q|}$$

and $$norm_q = \sqrt{\sum_{t \in q} tf_{t,q} * idf_t^2}$$

The above formulas are based on the Lucene Search Engine query evaluation.

Field boosts indicate, that since an e-mail is broken into several fields, it is important to recognize that some fields are more important than others. The e-mail fields are assigned different field boosts to incorporate such factors. In one example, a search engine assigns the following field boost values:

| Region | Boost Value |
|---|---|
| FromList | 2.0 |
| ToList | 1.5 |
| CcList | 1.2 |
| BccList | 1.5 |
| SentDateTime | Broken into several buckets of time ranges, with most recent e-mails receiving 1.0 and least recent receiving 0.1 |
| Importance | 2.0 |
| Subject | 1.5 |
| Unstemmed Subject | 1.5 |
| E-mailScope | 2.0 |
| NewText | 1.0 |
| UnstemmedNewText | 1.0 |
| Attachment | 0.5 |
| UnstemmedAttachment | 0.5 |
| QuotedText | (1.0 − 0.1 * Level-of-quoted region), where the outer-most containing e-mail is level-1 and each additional inner e-mail adds to the level. |
| UnstemmedQuotedText | Same as QuotedText |

Boosts for regions may be applied in the Query Scoring formula as follows. Each region's terms are weighted using the boost for the region. For each region r∈R, the weights for that region are represented by:

$$w_{t,r} = weight_{t,r} * boost_{t,r}$$

The normalization factor is also altered in the following way:

$$norm_{d,r} = norm_d * boost_r$$

Given the altered weights and normalization factors, the complete scoring is computed per region, and then aggregated into a relevance score:

$$s(q, d) = \sum_{r \in R} \sum_{t \in q} \frac{tf_{t,q} * idf_t}{norm_{q,r}} * \frac{tf_{t,d} * idf_t}{norm_{d,r}} * coord_{q,d} * w_{t,r}$$

In step 1545, the ordered and relevant results are collected. In step 1550, the results are presented to the user or output to an application. In one example, in step 1555, a summary of the results is presented to the user. The summary may be presented in a format allowing the user to drill-down or click down on the summary to obtain more detailed information. In step 1560, detailed hits are displayed. In step 1565, a navigation histogram is displayed. One example of a navigation histogram is described further with respect to FIG. 19.

In various embodiments, the relational tables are organized around determining a set of e-mails and documents that match a set of complex SQL Queries. A main relational table may track all e-mails that have been identified as e-mail documents. A common key (join key) between the full-text tables and the relational database tables may be a unique document id (e.g., EMAILDOCID) associated with each e-mail (as well as attachment), and a full-text index document number (EMAILFTID). Both EMAILDOCID and EMAIL-FTID are stored in both the SQL database. The full-text index may also store a DOCID associated with each e-mail identified as an e-mail document.

In some embodiments, computer system 300 determines a query plan that combines searching both the full-text index and the relational database tables. In one example, there are the following three execution options for executing a combined query: 1) Execute the database query first and feed the results (FTIDs) into the full-text query (option here after referred to as DtoF); 2) Execute the full-text query and feed the results into the database query (FtoD); and 3) Execute both the queries independently and combine the two result sets (using hash-based join algorithm) in the Query Engine layer (DjoinF).

Computer system 300 may determine which execution option to pursue in response to a cost-based heuristics. In various embodiments, a cost analysis is performed where the costs of executing the queries independently are assumed as follows:

$C_D$—Cost of executing the database query;
$C_F$—Cost of executing the full-text query.

Then, the costs associated with the three execution options above may be described as follows:

$C_{DtoF}=C_D+C_F'$, where $C_F'$ is the new cost of executing the full-text query;
$C_{FtoD}=C_F+C_D'$, where $C_D'$ is the new cost of executing the database query;
$C_{DjoinF}=C_D+C_F+C_{join}$, where $C_{join}$ is the cost of joining the two results.

In one embodiments, the query execution cost is dominated by I/O costs, unless the database is small enough to be cached entirely in memory. Given this, option 1 or 2 may be cheaper than option 3, only if $C_F'$ or $C_D'$ costs are less than the original costs $C_F$ and $C_D$ respectively. The new costs can be less, if passing the result of one query to another reduces the I/O cost of the second query.

Figure 17:
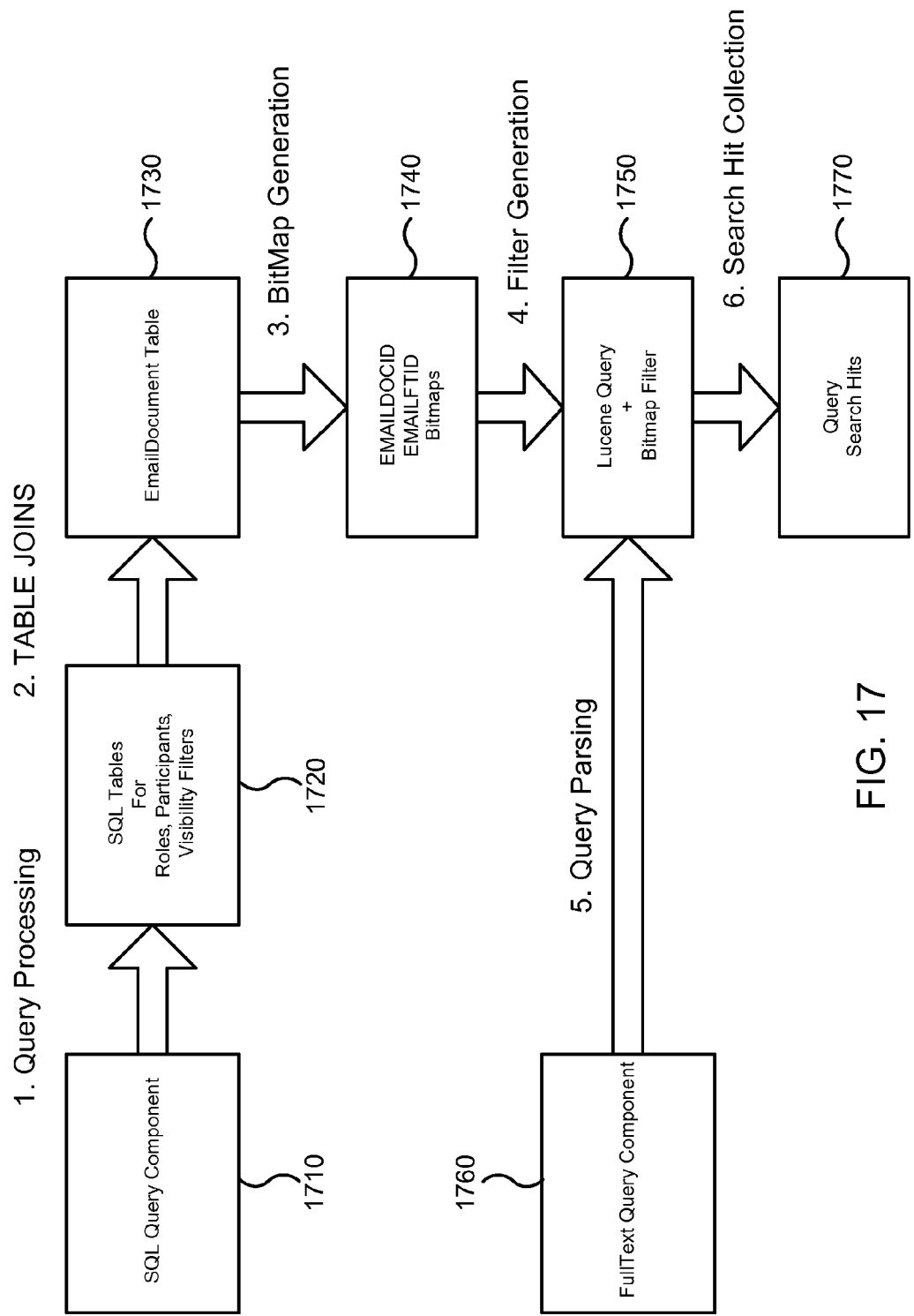
FIG. 17 is a block diagram illustrating filtering search results in one embodiment according to the present invention.

FIG. 17 is a block diagram illustrating filtering search results in one embodiment according to the present invention. In regard to $C_{DtoF}$, passing the FTIDs resulting from the database query execution to the full-text engine can be achieved by constructing a filter (bitmap) for those documents. This option may be used in cases where the number of result rows from the database query is small (e.g., less than 10,000) and the expected number of hits from the full-text query is relatively large.

In step 1710, a search query is separated into parts/components that are relevant for the relational database (e.g., SQL component), and another for the full-text index (Full-Text Query component). In step 1720, the SQL component is processed, using several database table JOIN operations, with a final JOIN against the EmailDocument table for roles, participants, visibility filters, and the like. In step 1730, a collection is yielded of EMAILDOCID and EMAILFTID in an e-mail document table.

In step 1740, the EMAILFTIDs are then converted into a Bitmap. The bitmap is then supplied to the full-text engine as a Filter. In step 1750, the full-text engine processes the Filter, plus the Full-Text Query component used in step 1760. In step 1770, a collection of search hits is yielded.

In regard to the $C_{FtoD}$, feeding the DOCIDs resulting from the full-text query execution to the database query can be achieved by adding a "docid IN (d1, d2, . . . )" clause to the original database query. The modified database query will be more efficient than the original query, if the number of rows selected from the EmailDocument table in step 1730 is significantly reduced because of a new IN clause constraint.

Figure 18:
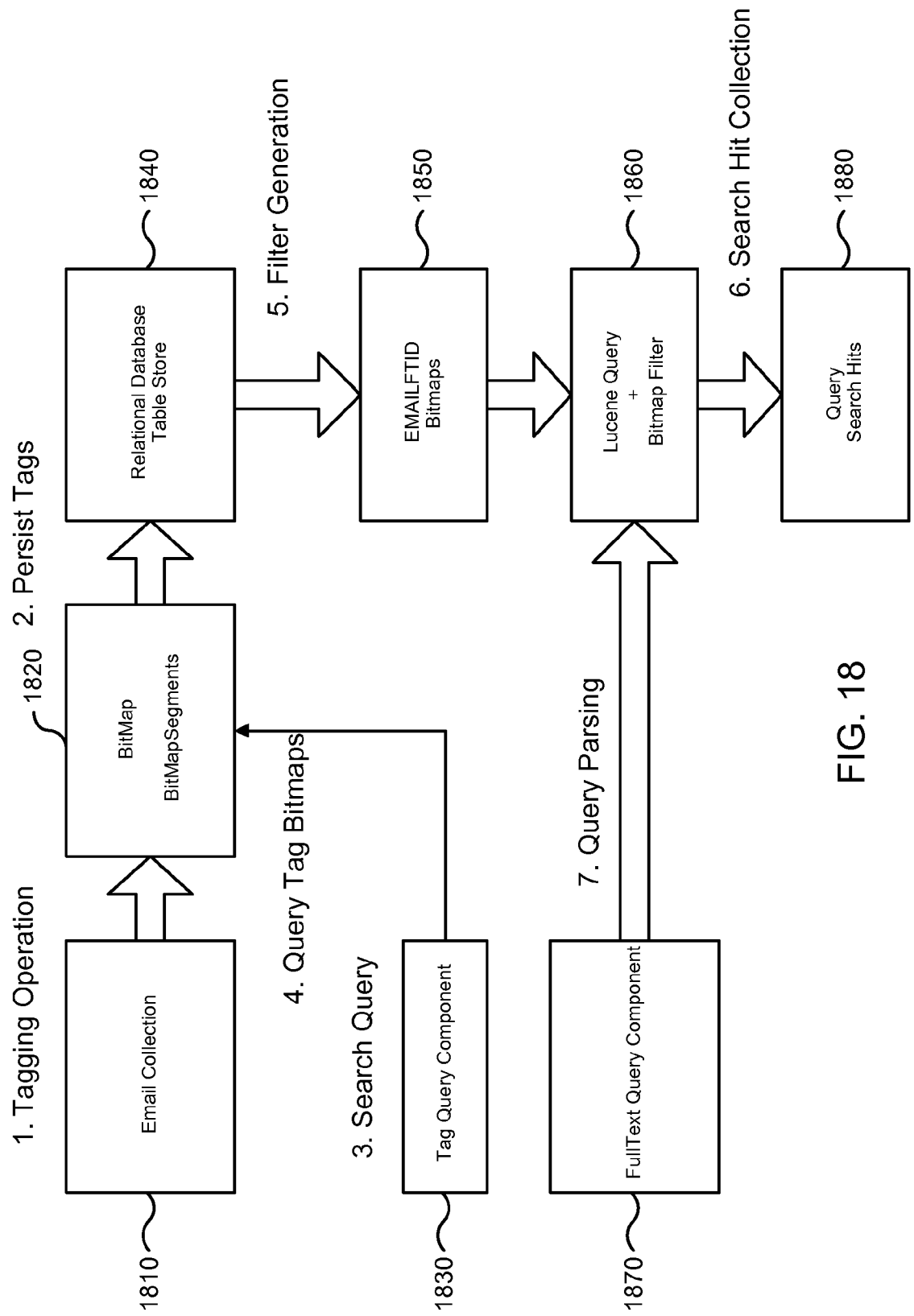
FIG. 18 is a block diagram illustrating tagging of e-mails in one embodiment according to the present invention.

FIG. 18 is a block diagram illustrating tagging of e-mails in one embodiment according to the present invention. In this example, in step 1810, a collection of e-mails are tagged using user-specified tag actions. A tag is any label, symbol, or identifier. As an example, the review process for reviewing large volumes of e-mails requires tagging e-mails with special tags, and then other searches for only those e-mails that contain these special tags.

In step 1820, the tagging operation is stored in the form of bitmaps, where each position in the bitmap represents whether a particular e-mail or document has been tagged. Note that the same e-mail can be tagged in multiple independent tags, resulting in many Tag Bitmaps. In step 1830, the Tag Query is processed to obtain Query Tag Bitmaps. In step 1840, the bitmaps may be stored in the relational database in two tables T_BITMAP and T_BITMAPSEGMENT. At BitMap store time, the BitMap object and the segments may be stored in one transaction. In some embodiments, only those bitmap segments that contain a sequence of bits in either an ON or OFF state are stored, to conserve on space for bitmaps and the associated I/O load on bitmaps.

In step 1850, the bitmap is then supplied to the full-text engine as a Filter. In step 1860, the full-text engine processes the Filter, plus the Full-Text Query component used in step 1870. In step 1880, a collection of search hits is yielded.

Figure 19:
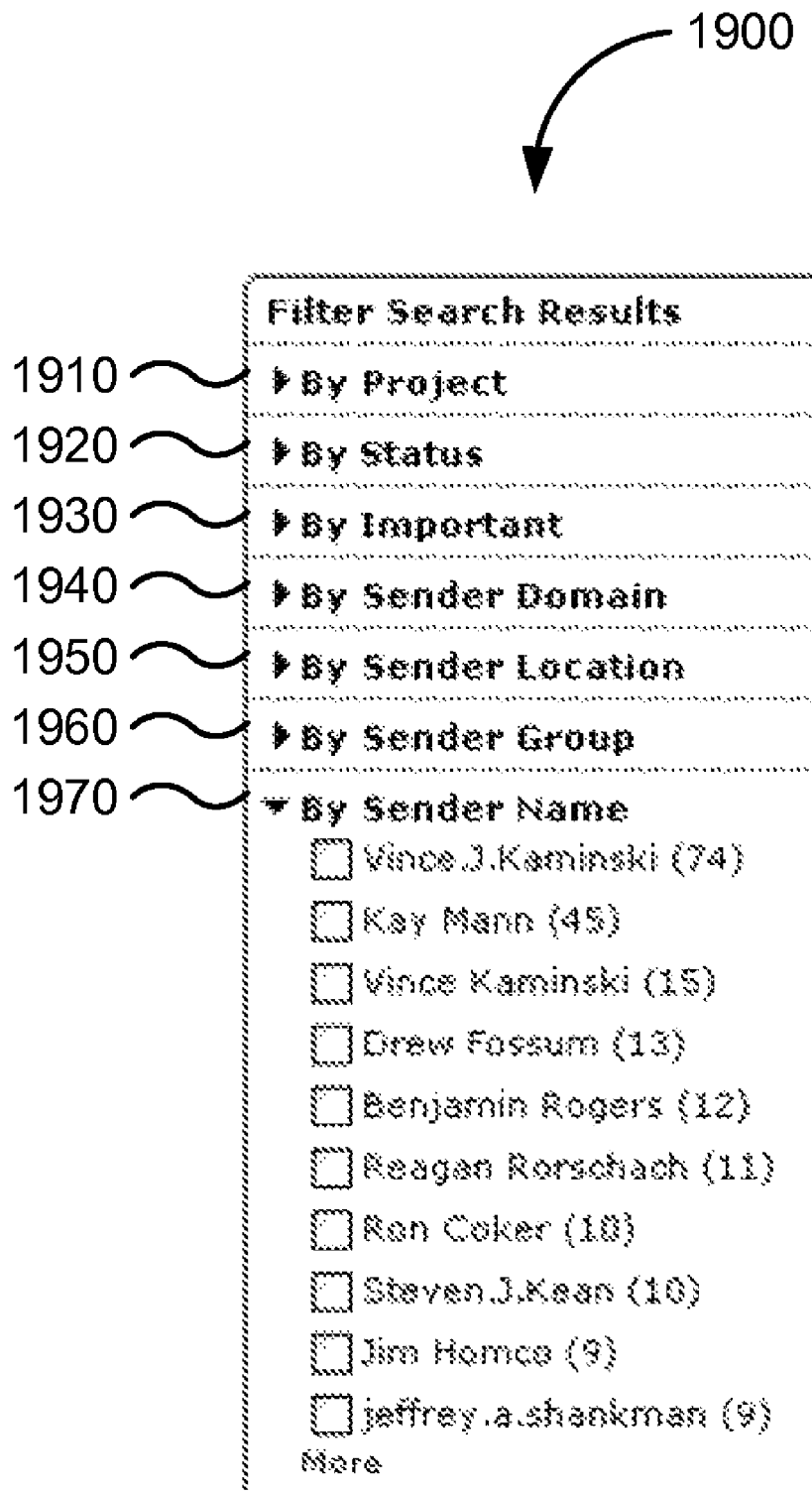
FIG. 19 is a screenshot illustrating a collection of search results in one embodiment according to the present invention.

FIG. 19 is a screenshot 1900 illustrating a collection of search results in one embodiment according to the present invention. In general, the results of a search (e.g., the results of steps 1770 of FIGS. 7 and 1880 of FIG. 18) is a collection of search results, plus a collection of histograms for each attribute of the result. The following are some attributes of a search result:

| Item | Reason |
| --- | --- |
| Sender Name | The Sender of an e-mail |
| Recipient | The Recipients of an e-mail |
| Sender Groups | The organizational groups the sender belongs |
| Recipient Groups | The organizational groups the recipients belong to |
| Sender Domain | The e-mail domain of the sender |

-continued

| Item | Reason |
|---|---|
| Recipient Domain | The e-mail domain of the recipients |
| Custodian | The Owner/Source location from which an e-mail was retrieved |
| Project Tags | The various tags that were applied to the e-mail. |

A histogram is a breakdown of the search results. For example, a histogram may be broken down into the above categories. Referring to FIG. 19, screenshot 1900 includes a project attribute 1910, a status attribute 1920, an important attribute 1930, a sender domain attribute 1940, a sender location attribute 1950, a sender group attribute 1960, and a sender name attribute 1970.

For sender name attribute 1970, the actual counts of the search results are displayed next the sender name, that contain this attribute. This allows the search results to be further filtered, using a guided navigation paradigm. For example, selecting an item narrows the results to only those search hits that pertain to the displayed histogram item.

Figure 20:
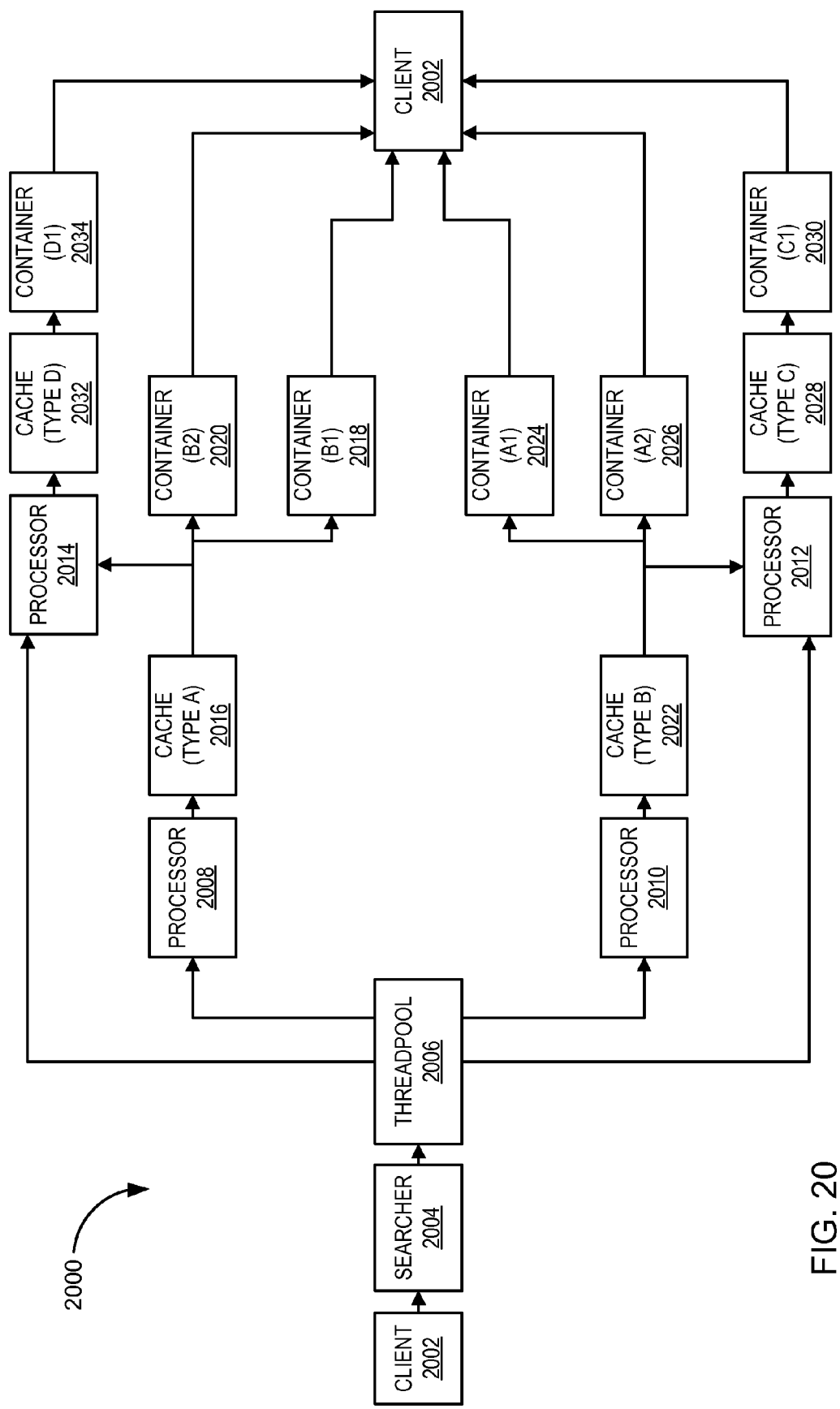
FIG. 20 is a block diagram illustrating a system for asynchronous query execution in one embodiment of the present invention.

FIG. 20 is a block diagram illustrating a system 2000 for asynchronous query execution in one embodiment of the present invention. In this example, system 2000 includes a client 2002, a searcher 2004, a threadpool 2006, a processor 2008, a processor 2010, a processor 2012, a processor 2014, a cache 2016, a container 2018, a container 2020, a cache 2022, a container 2024, a container 2026, a cache 2028, a container 2030, a cache 2032, and a container 2034.

In general, when very large number of results are retrieved, the search and results retrieval time can take significant processing time. Accordingly, useful partial search results may be initially presented, while the rest of the results are computed in the background. In various embodiments, the results are ranked, so that the search operation can determine relevant initial results and present them to the user, while additional further remaining results may be computed.

A large amount of detail summarizing ongoing search discoveries may be displayed (e.g., using a histogram as in FIG. 19) even while the initial results have been displayed and made available for use by client 2002. Detail may be extended to include not only summary counts, but also other kinds of feedback including search status keywords, exceptional results, and the like. The level of detail and its multi-dimensional relationship to the search activity of client 2002 give a user a much greater sense of the value of the ongoing search activity than single-dimensional displays such as a search progress bar.

In one example of operation, search client 2002 sends the search parameters to searcher 2004 (e.g., computer system 300 of FIG. 3). Searcher 2004 launches multiple threads using threadpool 2006. In this example, each thread runs a processor (e.g., processors 2008, 2010, 2012, and 2014). Each processor is responsible for fetching a certain type or types of objects.

In some embodiments, the input to a processor may be either the search parameters or the output of other processors. The objects fetched by each processor are stored in caches, one for each type of the object. Each cache can have one or more containers associated with it. The containers can specify filter criteria when they attach with the caches. Based on these criteria, the cache sends those objects to the containers as it receives it.

In some embodiments, two object streams may be coming from independent streams. Each object can have a weight with which it is associated. It is possible that the same object is present in both streams, but with different weights. Given that both streams are already sorted on that weight, both streams may be merged, thereby eliminating duplicates, and dynamically merging object weights.

In one embodiment, when objects are inserted into the cache, those objects are tagged with meta-information. For example, many objects are derived from other objects, such as Type A becomes Type B becomes Type C. In this case, all source and target objects are tagged with these relationships. This allows the containers to apply filter criteria. For example, a container can ask for Type B objects that are derived from a given Type A object.

The consumer of the containers (e.g., client 2002 or another processor) can start fetching objects even when a search is ongoing. In some embodiments, client 2002 displays initial search results, and then submits a search progress request to system 2000. For example, client 2002 may submit a search progress request to container 2024, after which container 2024 returns search progress data blocks to client 2002. The initial results may be displayed in a graphical user interface, where summary results are displayed in a right side pane of a dialog window, and detailed results are displayed in a left side pane of the dialog window.

Client 2002 updates presentation of search progress information, and repeats search progress requests until receiving an indication that the search is complete. In one embodiment, a differentiated display treatment indicates that the search is complete. Accordingly, client 2002 can be made to continuously poll an information server (e.g., container 2024) for an arbitrarily complex status block, and unobtrusively display that block's contents to the user until the block reports that the results are "final."

In various embodiments, system 2000 includes four modules: a search progress display template, a search progress data provider, a client script-based search progress processor, and a client-based progress request mechanism.

The search progress display template renders the display of search progress in a form that may be displayed on client 2002, and subsequently, filled-in by the client search progress processor module. In one embodiment, the search progress display template is rendered in HTML using a Java Server-Page (.jsp). Identifiers in the form of ID attributes may be assigned to certain SPAN or DIV HTML elements designated as containers of progress information. The identifiers indicate which data is contained by each relevant SPAN or DIV. Some example identifiers are "messageCount," "discussionCount," and "topicCount."

In various embodiments, the search progress data provider module includes a Java Servlet that is executed in response to a search progress request from client 2002. The Servlet consists of Java code that outputs XML data containing cumulative results of the search. XML elements may be used to denote summary progress information corresponding to elements appearing in the Search Progress Display Template such as <messageCount>, <discussionCount>, and <topicCount>. These names may match or may simply be mapped from XML data block to template element by the search progress processor module.

In some embodiments, the client-based search progress processor module processes the requested data returned by the search progress data provider. In general, incoming XML requests are received, parsed, and inserted into the search progress display template. After inserting results, the client progress processor module may alter the display to indicate the search is complete, or issue another search progress request.

In one embodiment, the client-based search progress request mechanism module issues requests of various types to searcher 2004. For example, requests may be issued as an XMLHttpRequest, a browser facility that is used to silently send the request to the server without interrupting or otherwise disturbing use of the current page. This facility, coupled with the XML data returned and the script-based incorporation of results into HTML pages, is sometimes referred to as AJAX technology, AJAX being an acronym for Asynchronous Javascript and XML.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for searching e-mails, the method comprising:
    receiving, at one or more computer systems communicatively coupled to a plurality of databases indexing the e-mails, information indicative of one or more search terms;
    determining, with one or more processors associated with the one or more computer systems, a query plan based on the one or more search terms that specifies an interleaving between querying a first database in the plurality of databases that contains metadata associated with the e-mails and querying a second database in the plurality of databases that contains a full text index of the e-mails, the interleaving defining how results of a first database query against one database in the first or second databases influence a second database query against the other database in the first or second database;
    performing, with the one or more processors associated with the one or more computer systems, a search in response to the query plan to determine information related to the one or more e-mails; and
    generating, with the one or more processors associated with the one or more computer systems, a set of results based on the information related to the one or more e-mails.

2. The method of claim 1 wherein determining, with the one or more processors associated with the one or more computer systems, the query plan based on the one or more search terms comprises:
    determining a cost associated with executing the first database query against the first database;
    determining a cost associated with executing the second database query against the second database;
    determining the interleaving between querying the first database and querying the second database based on the cost associated with executing the first database query and the cost associated with executing the second database query; and
    generating the query plan using a combination of the first database query and the second database query.

3. The method of claim 1 wherein generating, with the one or more processors associated with the one or more computer systems, the set of results based on the information related to the one or more e-mails comprises:
    receiving, at the one or more computer systems, a first portion of the information in response to the first database query;
    receiving, at the one or more computer systems, a second portion of the information in response to the second database query; and
    merging, with the one or more processors associated with the one or more computer systems, the first and second portions of the information to generate the set of results.

4. The method of claim 1 wherein determining, with the one or more processors associated with the one or more computer systems, the query plan further comprises:
    receiving, at the one or more computer systems, information indicative of a filter associated the e-mails; and
    modifying, with the one or more processors associated with the one or more computer systems, at least the first or second database query in response to the filter.

5. The method of claim 1 wherein performing, with the one or more processors associated with the one or more computer systems, the search comprises performing the search asynchronously.

6. The method of claim 1 further comprising:
    determining, with the one or more processors associated with the one or more computer systems, a score associated with each of the e-mails in response to a weighted average for a sender identifier related to an e-mail message and one or more recipient identifiers related to the e-mail message, the weighted average quantifying text contributed by the sender of the e-mail message; and
    generating, with the one or more processors associated with the one or more computer systems, the set of results based on at least one score associated with at least one e-mail.

7. The method of claim 6 further comprising:
    determining, with the one or more processors associated with the one or more computer systems, relevance of the e-mails in response to the score associated with each of the e-mails; and
    generating, with the one or more processors associated with the one or more computer systems, the set of results based on relevance of at least one e-mail.

8. A computer-readable storage medium storing a set of code modules which when executed by a processor of a computer system cause the processor to search for e-mails, the computer-readable storage medium comprising:
    code for receiving information indicative of one or more search terms;
    code for determining a query plan based on the one or more search terms that specifies an interleaving between querying a first database in a plurality of databases that contains metadata associated with the e-mails and querying a second database in the plurality of databases that contains a full text index of the e-mails, the interleaving defining how results of a first database query against one database in the first or second databases influence a second database query against the other database in the first or second database;
    code for performing a search in response to the query plan to determine information related to the one or more e-mails; and
    code for generating a set of results based on the information related to the one or more e-mails.

9. The computer-readable storage medium of claim 8 wherein the code for determining the query plan based on the one or more search terms comprises:

code for determining a cost associated with executing the first database query against the first database;

code for determining a cost associated with executing the second database query against the second database;

code for determining the interleaving between querying the first database and querying the second database based on the cost associated with executing the first database query and the cost associated with executing the second database query; and code for generating the query plan using a combination of the first database query and the second database query.

10. The computer-readable storage medium of claim 8 wherein the code for generating the set of results based on the information related to the one or more e-mails comprises:

code for receiving a first portion of the information in response to the first database query;

code for receiving a second portion of the information in response to the second database query; and code for merging the first and second portions of the information to generate the set of results.

11. The computer-readable storage medium of claim 8 wherein the code for determining the query plan further comprises:

code for receiving information indicative of a filter associated with the e-mails; and code for modifying at least the first or second database query in response to the filter.

12. The computer-readable storage medium of claim 8 wherein the code for performing the search comprises code for performing the search asynchronously.

13. The computer-readable storage medium of claim 8 further comprising:

code for determining a score associated with each of the e-mails in response to a weighted average for a sender identifier related to an e-mail message and one or more recipient identifiers related to the e-mail message, the weighted average quantifying text contributed by the sender of the e-mail message; and code for generating the set of results based on at least one score associated with at least one e-mail.

14. The computer-readable storage medium of claim 13 further comprising:

code for determining relevance of the one or more e-mails in response to the score associated with each of the e-mails; and code for generating the set of results based on relevance of at least one e-mail.

15. A system for searching for e-mails, the system comprising:

a set of one or more processors; and a set of one or more storage devices, each storage device communicatively coupled to at least one processor in the set of one or more processors and configured to store computer-executable instructions, the set of one or more storage devices storing a set of computer-executable instructions representing:

a crawler configured to receive a plurality of e-mails;

an indexer configured to store index information associated with the plurality of e-mails in a first database and a full-text index in a second database; and a query engine configured to:

receive information indicative of one or more search terms, determine a query plan based on the one or more search terms that specifies an interleaving between querying the first database and querying the second database, the interleaving defining how results of a first database query against one database in the first or second databases influence a second database query against the other database in the first or second database, perform a search in response to the query plan to determine information related to the one or more e-mails, and generate a set of results based on the information related to the one or more e-mails.

16. The system of claim 15 wherein the query engine is further configured to:

determine a cost associated with executing the first database query against the first database;

determine a cost associated with executing the second database query against the second database;

determine the interleaving between querying the first database and querying the second database based on the cost associated with executing the first database query and the cost associated with executing the second database query; and generate the query plan using a combination of the first database query and the second database query.

17. The system of claim 15 wherein the query engine is further configured to:

receive a first portion of the information in response to the first database query against the first database;

receive a second portion of the information in response to the second database query against the second database; and merge the first and second portions of the information to generate the set of results.

18. The system of claim 15 wherein the query engine is further configured to:

receive information indicative of a filter associated with the plurality of e-mails; and generate at least the first or second database query in response to the filter.

19. The system of claim 15 wherein the query engine is further configured to:

perform the search asynchronously using one or more search processors.

20. The system of claim 15 wherein the query engine is further configured to:

determine a score associated with each of the plurality of e-mails in response to a weighted average for a sender identifier related to an e-mail message and one or more recipient identifiers related to the e-mail message, the weighted average quantifying text contributed by the sender of the e-mail message; and generate the set of results based on at least one score associated with at least one e-mail.

21. The system of claim 20 wherein the query engine is further configured to:

determine relevance of the plurality of e-mails in response to the score associated with each of the plurality of e-mails; and generate the set of results based on relevance of at least one e-mail.

* * * * *